United States Patent
Greene et al.

(10) Patent No.: US 8,159,090 B2
(45) Date of Patent: Apr. 17, 2012

(54) HYBRID POWER HARVESTING AND METHOD

(75) Inventors: Charles E. Greene, Cabot, PA (US); Daniel W. Harrist, Carnegie, PA (US); John G. Shearer, Ligonier, PA (US)

(73) Assignee: Powercast Corporation, Ligonier, PA (US)

( * ) Notice: Subject to any disclaimer, the term of this patent is extended or adjusted under 35 U.S.C. 154(b) by 1180 days.

(21) Appl. No.: 11/897,346

(22) Filed: Aug. 30, 2007

(65) Prior Publication Data

US 2008/0054638 A1    Mar. 6, 2008

Related U.S. Application Data

(60) Provisional application No. 60/841,818, filed on Sep. 1, 2006.

(51) Int. Cl.
*H01F 27/42*    (2006.01)
*H04B 7/00*    (2006.01)

(52) U.S. Cl. ........................ 307/104; 455/41.2

(58) Field of Classification Search ............. 455/41.1, 455/41.2, 41.3, 39; 307/104, 154; 320/108
See application file for complete search history.

(56) References Cited

U.S. PATENT DOCUMENTS

| | | | |
|---|---|---|---|
| 6,304,059 B1 * | 10/2001 | Chalasani et al. | 320/118 |
| 6,633,026 B2 | 10/2003 | Tuominen | |
| 7,027,311 B2 * | 4/2006 | Vanderelli et al. | 363/8 |
| 7,639,994 B2 | 12/2009 | Greene et al. | |
| 7,692,411 B2 * | 4/2010 | Trainor et al. | 320/166 |
| 7,844,306 B2 | 11/2010 | Shearer et al. | |
| 7,868,482 B2 | 1/2011 | Greene et al. | |
| 2005/0186994 A1 * | 8/2005 | Rahmel et al. | 455/572 |
| 2006/0097667 A1 | 5/2006 | Kang et al. | |
| 2006/0164866 A1 | 7/2006 | Vanderelli et al. | |
| 2006/0199620 A1 | 9/2006 | Greene et al. | |
| 2007/0191074 A1 | 8/2007 | Harrist et al. | |

OTHER PUBLICATIONS

International Search Report for PCT/US2007/019039, mailed Sep. 12, 2008, 3 pages.
Written Opinion for PCT/US2007/019039, mailed Sep. 12, 2008, 3 pages.

* cited by examiner

*Primary Examiner* — Nguyen Vo

(57) ABSTRACT

A system of providing energy includes a transmitter for sending wirelessly a first type of energy and at least a second type of energy different from the first type of energy. The system includes a receiver for receiving wirelessly the first type of energy and converting it to usable energy. A transmitter for transmitting power wirelessly. A receiver for receiving wirelessly transmitted power. A method for providing energy.

48 Claims, 38 Drawing Sheets

HYBRID POWER HARVESTING AND METHOD

CROSS REFERENCE TO RELATED APPLICATIONS

This application claims the priority to U.S. Provisional Application No. 60/841,818 filed Sep. 1, 2006 and "Hybrid Power Harvesting and Method."

FIELD OF THE INVENTION

The present invention is directed to power harvesting transmitters, receivers, and systems that combines two or more types of energy for wireless power transfer. The invention preferably uses radio frequency (RF) energy as a source of energy.

BACKGROUND OF THE INVENTION

As processor capabilities have expanded and power requirements have decreased, there has been an ongoing explosion of devices that operate completely independent of wires or power cords. These "untethered" devices range from cell phones and wireless keyboards to building sensors and active Radio Frequency Identification (RFID) tags.

Engineers and designers of these untethered devices continue to have to deal with the limitations of portable power sources, primarily using batteries as the key design parameter. While the performance of processors and portable devices has been doubling every 18-24 months (driven by Moore's law), battery technology in terms of capacity has only been growing at 6% per year.

Even with power conscious designs and the latest in battery technology, many devices do not meet the lifetime cost and maintenance requirements for applications that require a large number of untethered devices, such as logistics and building automation. Today's devices that need two-way communication require scheduled maintenance every three to 18 months to replace or recharge the device's power source (typically a battery). One-way devices that simply broadcast their status without receiving any signals, such as automated utility meter readers, have a better battery life typically requiring replacement within 10 years. For both device types, scheduled power-source maintenance is costly and can be disruptive to the entire system that a device is intended to monitor and/or control. Unscheduled maintenance trips are even more costly and disruptive. On a macro level, the relatively high cost associated with the internal battery also reduces the practical, or economically viable, number of devices that can be deployed.

The ideal solution to the power problem for untethered devices is a device or system that can collect and harness sufficient energy from the environment. The harnessed energy would then either directly power an untethered device or augment a power supply. However, this ideal solution may not always be practical to implement due to low energy in the environment and site restrictions that limit the ability to use a dedicated energy supply.

A need exists for a system that takes these factors into account and provides a solution for the ideal situation and for more restrictive circumstances.

It is known to power a device through inductive coupling (near-field). Power transfer by inductive coupling requires the device to be relatively close to the power transmission source. The *RFID Handbook* by the author Klaus Finkenzeller defines the inductive coupling region as a distance between the transmitter and receiver of less than 0.16 times lambda, where lambda is the wavelength of the RF wave.

It is known to power a device through harvesting RF waves (far-field). The far-field region is distances greater than 0.16 times lambda.

It is known to power a device using solar, acoustic, vibration, ultraviolet, infrared, thermal, wind, pressure, magnetic, inductive, capacitive, and other types of energy.

A need exists for a system that transfers power using various combinations of types of energy being transmitted and/or received.

BRIEF SUMMARY OF THE INVENTION

It is an object of this invention to provide a system for delivering usable energy to a wireless power supply using a combination of types of energy supplied by a hybrid power transmitter. The power is supplied to charge or re-charge a device or to directly power the device.

A method and apparatus for high efficiency RF rectification for various loads, which is suitable for use with the present invention, has been discussed in detail in U.S. Provisional Patent Application No. 60/729,792, which is incorporated herein by reference.

The invention pertains to one or more receivers collecting energy that is transmitted from one or more sources. After collection of the energy, the receivers transform the energy into a form or power useable by an end device, such as, but not limited to direct current (DC) power using a converting circuit, power harvester, or energy harvester. The end device(s) may be wireless sensors, solid-state lighting, or the recharging of batteries. It is the focus of the invention to describe transmitting multiple types of energy to one or more receivers. One transmitter may transmit more than one type of energy, and one receiver may receive more than one type of energy. There may be more than one transmitter of one type of energy in a given area, making a network of transmitters. Conversely, there may be more that one receiver for receiving energy from one transmitter, or a network of transmitters. Likewise, one or more receivers may receive energy from more than one transmitter, or a network of transmitters.

The present invention pertains to a system of providing energy. The system comprises a transmitter for sending wirelessly a first type of energy and at least a second type of energy different from the first type of energy. The system comprises a receiver for receiving wirelessly the first type of energy and converting it to usable energy.

The present invention pertains to a transmitter for transmitting power wirelessly. The transmitter comprises a transmitter housing. The transmitter comprises a first energy generator attached to the housing for producing a first type of wireless energy. The transmitter comprises at least a second energy generator attached to the housing for producing a second type of wireless energy different from the first type of energy.

The present invention pertains to a receiver for receiving wirelessly transmitted power. The receiver comprises a receiver housing. The receiver comprises a power harvester attached to the housing for receiving wirelessly a first type of energy and receiving wirelessly at least a second type of energy different from the first type of energy and converting the first and second energies into usable energy.

The present invention pertains to a method for providing energy. The method comprises the steps of sending wirelessly from a transmitter a first type of energy and at least a second type of energy different from the first type of energy. There is the step of receiving wirelessly at a receiver the first type of energy. There is the step of converting at the receiver the first type of energy to usable energy to power a component.

The present invention pertains to a transmitter for transmitting power wirelessly. The transmitter comprises a first energy generator for producing a first type of wireless energy wirelessly. The transmitter comprises at least a second energy generator for producing at least a second type of wireless energy different from the first type of energy wirelessly. The transmitter comprises at least a first point of emission connected to the first energy generator from which the first energy is wirelessly sent from the transmitter.

The present invention pertains to a receiver for receiving wirelessly transmitted power. The receiver comprises at least a first point of reception for receiving wirelessly a first type of energy and receiving wirelessly at least a second type of energy different from the first type of energy. The receiver comprises a power harvester connected to the point of reception for converting the first and second energies into usable energy.

The present invention pertains to a system of providing energy. The system comprises a transmitter for sending wirelessly n types energy, where n is greater than or equal to 2 and is an integer, and each of the n types of energy are different from each other. The system comprises a receiver for receiving wirelessly the n types of energy converting each of the n types of energy into usable energy.

DETAILED DESCRIPTION OF THE INVENTION

Figure 1:
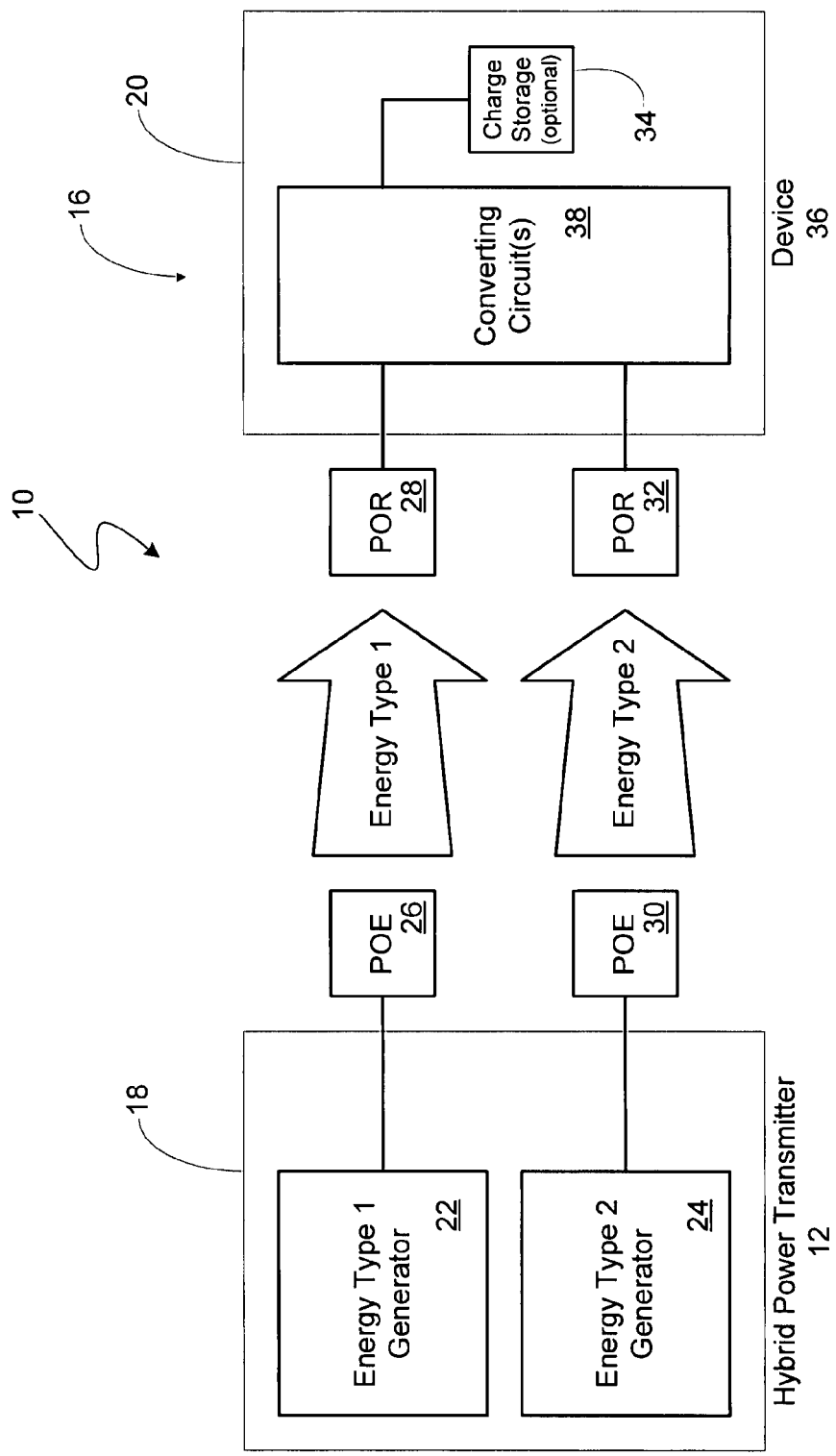
FIG. 1 is an illustration of an apparatus for charging a device according to the present invention.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention pertains to a system 10 of providing energy. The system 10 comprises a transmitter 12 for sending wirelessly a first type of energy and at least a second type of energy different from the first type of energy. The system 10 comprises a receiver 14 for receiving wirelessly the first type of energy and converting it to usable energy.

The first and second energies can be sent simultaneously from the transmitter 12. The first and second energies can be sent at different times from the transmitter 12. The transmitter 12 can include at least a first point of emission 26 from which the first and second types of energy are sent. The first type of energy is preferably RF energy. The receiver 14 can include a power harvester 16 connected to the component which converts the first and second types of energy into usable energy.

The usable energy is preferably electrical energy. The receiver 14 can receive the first and second types of energy simultaneously. The receiver 14 can receive the first and second types of energy at different times. The receiver 14 can include at least a first point of reception 28 at which the first and second energies are received. The receiver 14 can receive wirelessly the second type of energy and convert it to usable energy to power a component.

The transmitter 12 can include a first point of emission 26 and a second point of emission 30 from which the first and second types of energy are sent, respectively. The first point of emission 26 can have a first coverage area and the second point of emission 30 can have a second coverage area. The first and second coverage areas can overlap.

The first type of energy and the second type of energy can be mechanical, electrical or photonic and more specifically can be either RF, inductive, capacitive, visible light, infrared light, ultraviolet light, solar, sub sonic, sonic, ultra sonic, vibration, wind, or pressure.

The first point of emission 26 can include a near field antenna 42 and the second point of emission 30 can include a far field antenna 42. The transmitter 12 can include a first frequency generator 50 connected to the near field antenna 42 that produces power at a first frequency, and a second frequency generator 50 connected to the far field antenna 42 that produces power at the second frequency. The transmitter 12 can include an amplifier 48 connected to the first and second frequency generators 50. The transmitter 12 can include a controller 46 in electrical communication with the first and second frequency generators 50 to determine which antenna 42 transmits power at a given time. The controller 46 can cause the power to be pulsed by the first and second frequency generators 50.

The transmitter 12 can include a combiner 54 in electrical communication with the first and second frequency generators 50. The transmitter 12 can include a switch 52 connected to the combiner 54 which combines the power at the first frequency and at the second frequency into one transmission to the switch 52, which directs the one transmission to the first point of emission 26 or the second point of emission 30 or to neither point of emission. The first point of emission 26 can have a high impedance regarding the second frequency so essentially no power is transmitted from the first point of emission 26 at the second frequency, and the second point of emission 30 has a high impedance regarding the first frequency so essentially no power is transmitted from the second point of emission 30 at the first frequency. The transmitter 12 can include an in-line circulator in electrical communication with the switch 52 that reroutes any reflections or feedback to a matched load.

The transmitter 12 can include a dual frequency generator 50 in electrical communication with the near field antenna 42 and the far field antenna 42 that transmits power at a first frequency to the near field antenna 42 and at a second frequency to the far field antenna 42. The transmitter 12 can include a first amplifier 48 in electrical communication with and disposed between the dual frequency generator 50 and the near field antenna 42, and a second amplifier 48 in electrical communication with and disposed between the dual frequency generator 50 and the far field antenna 42. The transmitter 12 can include a controller 46 in electrical communication with the dual frequency generator 50 and the near field and far field antennas 42 that controls which antenna 42 transmits power at any given time.

The transmitter 12 can include a frequency generator 50, a controller 46 in electrical communication with the frequency generator 50 which controls the frequency at which power is produced by the frequency generator 50, an amplifier 48 in electrical communication with the controller 46 which controls the amplifiers 48 again, a switch 52 in electrical communication with the controller 46 to control the switch 52 and whether the power is directed to the near field antenna 42 and the far field antenna 42.

The system 10 can include a dual band antenna 42/coil 40 which transmits both RF and magnetic energy.

The dual band antenna 42/coil 40 can include a broadband antenna 42.

The receiver 14 can include at least a first point of reception 28 at which the first energy is received and a second point of reception 32 at which the second energy is received. The receiver 14 can include a first rectification circuit and a second rectification circuit. The first rectification circuit can receive and convert magnetic energy and the second rectification circuit can receive and convert RF energy. The first point of reception 28 can include a near field antenna 42 in electrical communication with the first rectifier circuit and the second point of reception 32 can include a far field antenna 42 in electrical communication with the second rectifier circuit. The receiver 14 can include a charge storage 34 component in electrical indication with the near field antenna 42 and the far field antenna 42.

The receiver 14 can include a controller 46 which controls the rectification circuits. The receiver 14 can include a dual band or broadband rectification circuit. The receiver 14 can include a controller 46 for controlling the dual band or broadband rectification circuit. The impedance of the near field antenna 42 can be such that it does not affect the far field antenna 42, and the impedance of the far field antenna 42 can be such that it does not affect the near field antenna 42.

The impedance of the near field antenna 42 can be used to help impedance match the far field antenna 42 to the dual band or broadband rectification circuit and the impedance of the far field antenna 42 can be used to help impedance match the near field antenna 42 to the dual band or broadband rectification circuit.

The near field antenna 42 and the far field antenna 42 can be a single structure containing both a magnetic and electromagnetic capturing component. The structure can have a first port for near field energy reception and a second port for far field energy reception. The receiver 14 can include filters which electrically isolate the first port and the second port from each other. The structure can have a single port which receives both near field magnetic energy and far field electromagnetic energy. The far field antenna 42 can include a dipole having legs and the near field antenna 42 can include a coil 40 wound around a part of the dipole.

The first point of reception 28 and the second point of reception 32 are preferably in electrical communication with a device 36 for powering the device 36. The receiver 14 can include a first converting circuit and a second converting circuit electrically connected to the device 36 and the first point of reception 28 and the second point of reception 32, respectively, for powering the device 36.

The receiver 14 can include a charge storage 34 component in electrical communication with the first point of reception 28 and the second point of reception 32 for charging the charge storage 34 component.

The receiver 14 can include a single converting circuit 38 for converting the first and second types of energy into usable energy.

The first type of energy can be RF energy and the second type of energy can be light energy. The first type of energy can be RF energy and the second type of energy can be sonic energy. The first type of energy can be RF energy and the second type of energy can be vibration energy. The first type of energy can be RF energy and the second type of energy can be wind energy. The first type of energy can be RF energy and the second type of energy can be thermal energy. The first type of energy can be RF energy and the second type of energy can be pressure energy.

The present invention pertains to a transmitter 12 for transmitting power wirelessly. The transmitter 12 comprises a transmitter housing 18. The transmitter 12 comprises a first energy generator 22 attached to the housing for producing a first type of wireless energy. The transmitter 12 comprises at least a second energy generator 24 attached to the housing for producing a second type of wireless energy different from the first type of energy.

The present invention pertains to a receiver 14 for receiving wirelessly transmitted power. The receiver 14 comprises a receiver housing 20. The receiver 14 comprises a power harvester 16 attached to the housing for receiving wirelessly a first type of energy and receiving wirelessly at least a second type of energy different from the first type of energy and converting the first and second energies into usable energy.

The present invention pertains to a method for providing energy. The method comprises the steps of sending wirelessly from a transmitter 12 a first type of energy and at least a second type of energy different from the first type of energy. There is the step of receiving wirelessly at a receiver 14 the first type of energy. There is the step of converting at the receiver 14 the first type of energy to usable energy to power a component.

The receiving step preferably includes the step of receiving wirelessly at the receiver 14 the first type of energy and at least the second type of energy; and the converting step preferably includes the step of converting at the receiver 14 the first type of energy and the second type of energy to usable energy to power the component.

The present invention pertains to a transmitter 12 for transmitting power wirelessly. The transmitter 12 comprises a first energy generator 22 for producing a first type of wireless energy wirelessly. The transmitter 12 comprises at least a second energy generator 24 for producing at least a second type of wireless energy different from the first type of energy wirelessly. The transmitter 12 comprises at least a first point of emission 26 connected to the first energy generator 22 from which the first energy is wirelessly sent from the transmitter 12.

The transmitter 12 preferably includes at least a second point of emission 30 connected to the second energy generator 24 from which the second energy is wirelessly sent from the transmitter 12.

The present invention pertains to a receiver 14 for receiving wirelessly transmitted power. The receiver 14 comprises at least a first point of reception 28 for receiving wirelessly a first type of energy and receiving wirelessly at least a second type of energy different from the first type of energy. The receiver 14 comprises a power harvester 16 connected to the point of reception for converting the first and second energies into usable energy.

The present invention pertains to a system 10 of providing energy. The system 10 comprises a transmitter 12 for sending wirelessly n types energy, where n is greater than or equal to 2 and is an integer, and each of the n types of energy are different from each other. The system 10 comprises a receiver 14 for receiving wirelessly the n types of energy converting each of the n types of energy into usable energy.

In the operation of the invention, the following are incorporated herein by reference:

FFPT-1 wireless power supply—U.S. Pat. No. 7,027,311
FFPT-2 pulsing—U.S. patent application Ser. No. 11/356,892
FFPT-3 network—U.S. patent application Ser. No. 11/438,508
FFPT-6 High Efficiency Rectification—U.S. patent application Ser. No. 60/729,792
FFPT-8 pulsing CIP—U.S. patent application Ser. No. 60/758,018
FFPT-9 network CIP—U.S. patent application Ser. No. 60/763,582
FFPT-13 series network—U.S. Patent Application No. 60/833,864

The present invention is directed to power harvesting transmitters 12, receivers 14, and systems 10 that combine two or more types of energy for wireless power transfer. A simple system 10 example for two sources of energy can be seen in FIG. 1 where the hybrid power transmitter 12 includes two energy generators and two points of emission (POE) 26, 30. The transmitted energies, energy type 1 and energy type 2, are directed away from the POEs 26, 30 to form coverage areas (not shown). The depicted hybrid power receiver 14 (shown as part of a device 36 and shown individually in FIG. 2) has two points of reception (POR) 28, 32 for capturing the two types of transmitted energy when the PORs 28, 32 are within a coverage area established by a POE of the same energy type. It should be noted that in any of the embodiments, the PORs 28, 32 may be inside or outside of the device 36. The PORs 28, 32 are connected to a single converting circuit 38 or multiple converting circuits 38 whichever is found to be advantageous for the application. The output of the converting circuit(s) 38 is connected directly to a device 36 for direct powering application or to a charge storage 34 component for charging or recharging applications. It should be noted that the terms POE and POR may not be described by a single point in space but rather by an area or by a volume, in which case, the POE and POR describe the center of the area or volume.

Figure 3:
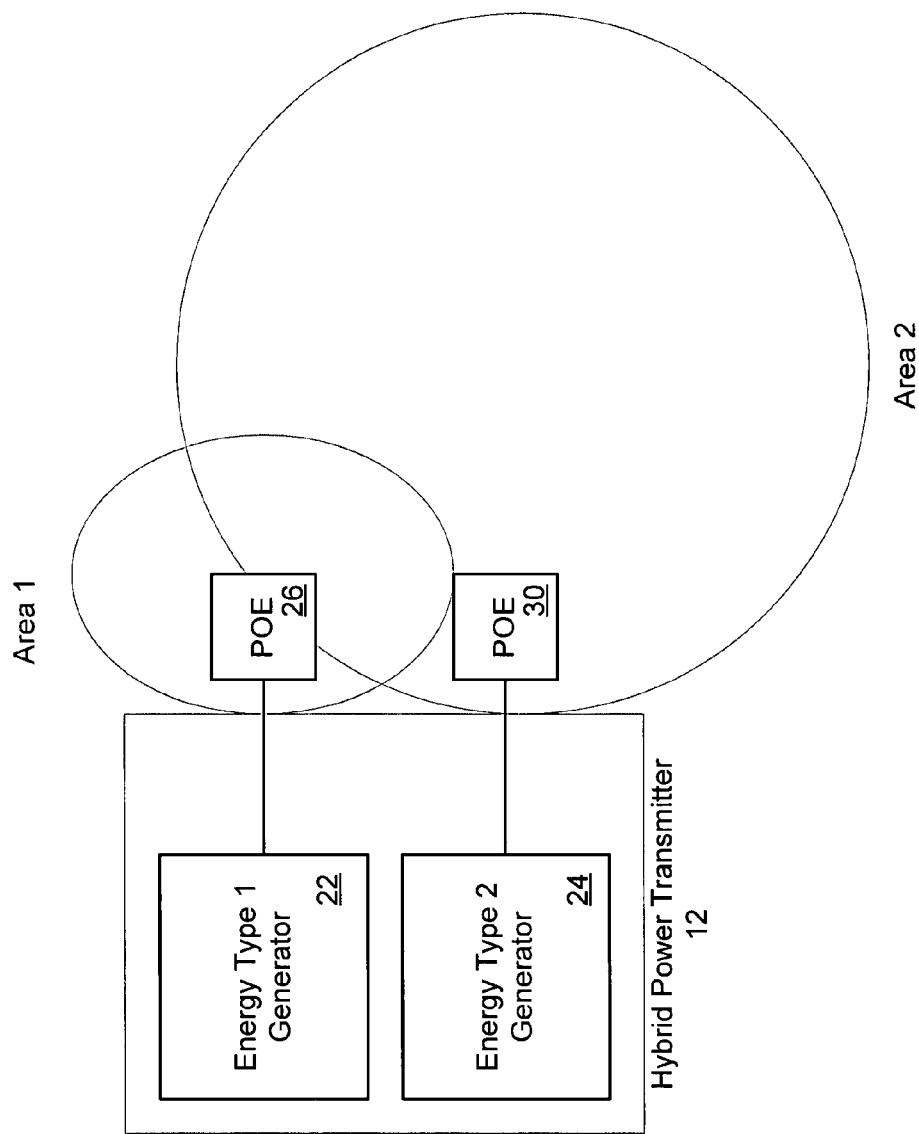
FIG. 3 is an illustration of a hybrid power transmitter according to the present invention.

More specifically, the invention includes a hybrid power transmitter 12 that generates two or more types of energy where each type of energy has its own respective coverage area, which may or may not overlap other coverage areas. An example of a hybrid transmitter 12 with two types of energy can be seen in FIG. 3 where the coverage areas, area 1 and area 2, overlap. A coverage area is defined as the area or volume where the power density is greater than a predetermined level. As an example, the coverage area may be defined as where the power density is greater than 100 milliwatts per square meter.

The types of energy used with the invention may include, but are not limited to, RF (electromagnetic field), inductive (magnetic field), capacitive (electric field), visible light, infrared (IR) light, ultra-violet (UV) light, solar, subsonic, sonic, ultrasonic, vibration, wind, pressure (short and long wavelength), or any other type of energy. The invention preferably uses RF energy as a source of energy. The invention also includes a receiver 14 that preferably has means for capturing two or more types of energy. Preferably, the receiver 14 has the ability to capture the types of energy generated by the hybrid power transmitter 12. If found to be advantageous, a receiver 14 may only contain a single means for harvesting a single type of energy.

Figure 4:
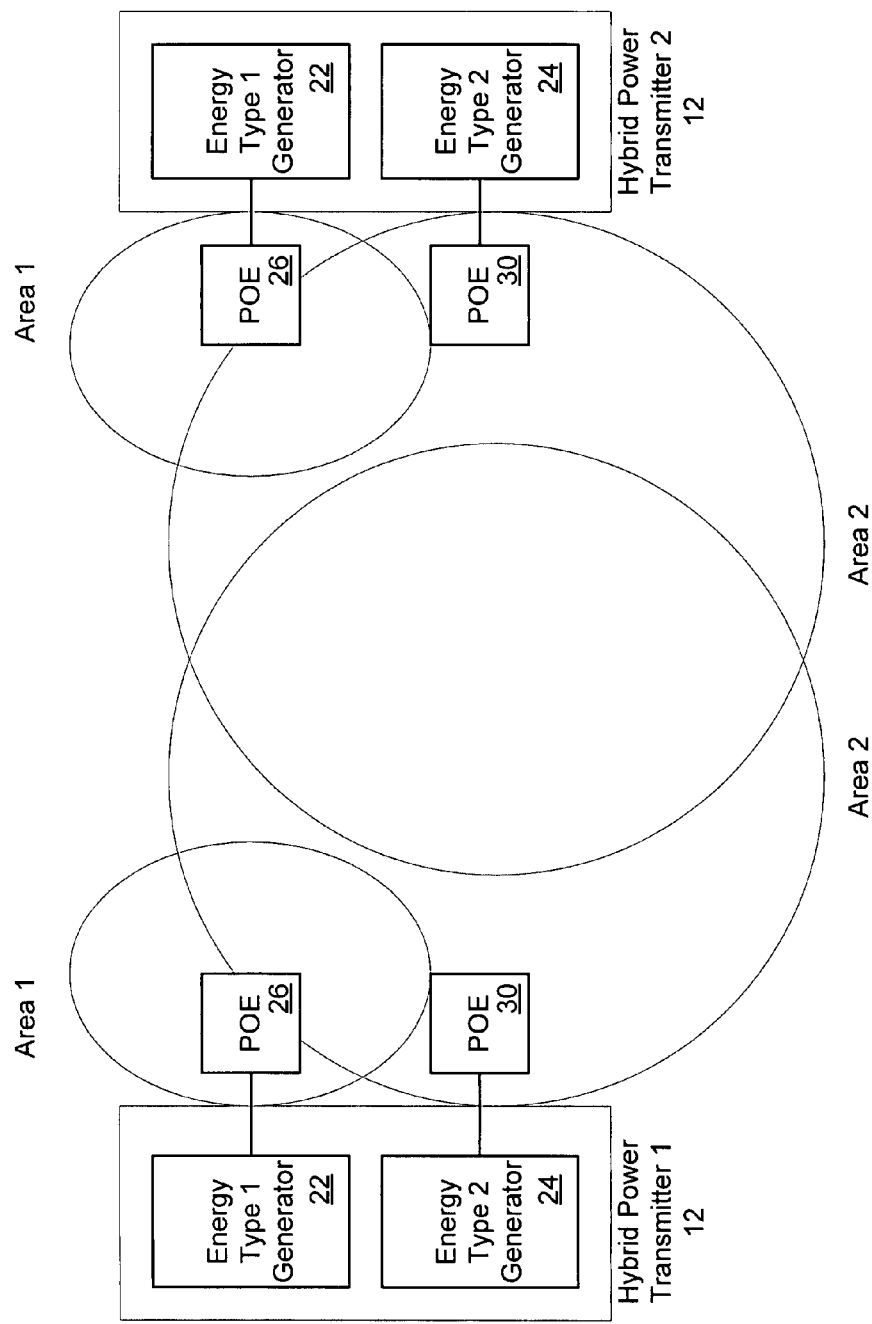
FIG. 4 is an illustration of a hybrid power network according to the present invention.

The invention also includes the ability to establish a network of hybrid power transmitters 12 to provide large coverage areas. The individual coverage areas from a hybrid power transmitter 12 may or may not overlap an individual coverage area from another hybrid power transmitter 12. An example of this can be seen in FIG. 4 where coverage Area 2 from Hybrid Power Transmitter 1 overlaps coverage Area 2 from Hybrid Power Transmitter 2. The overlap area defines an area where a POR of the appropriate type may receive power from multiple transmitters 12.

RF and Inductive

Figure 5:
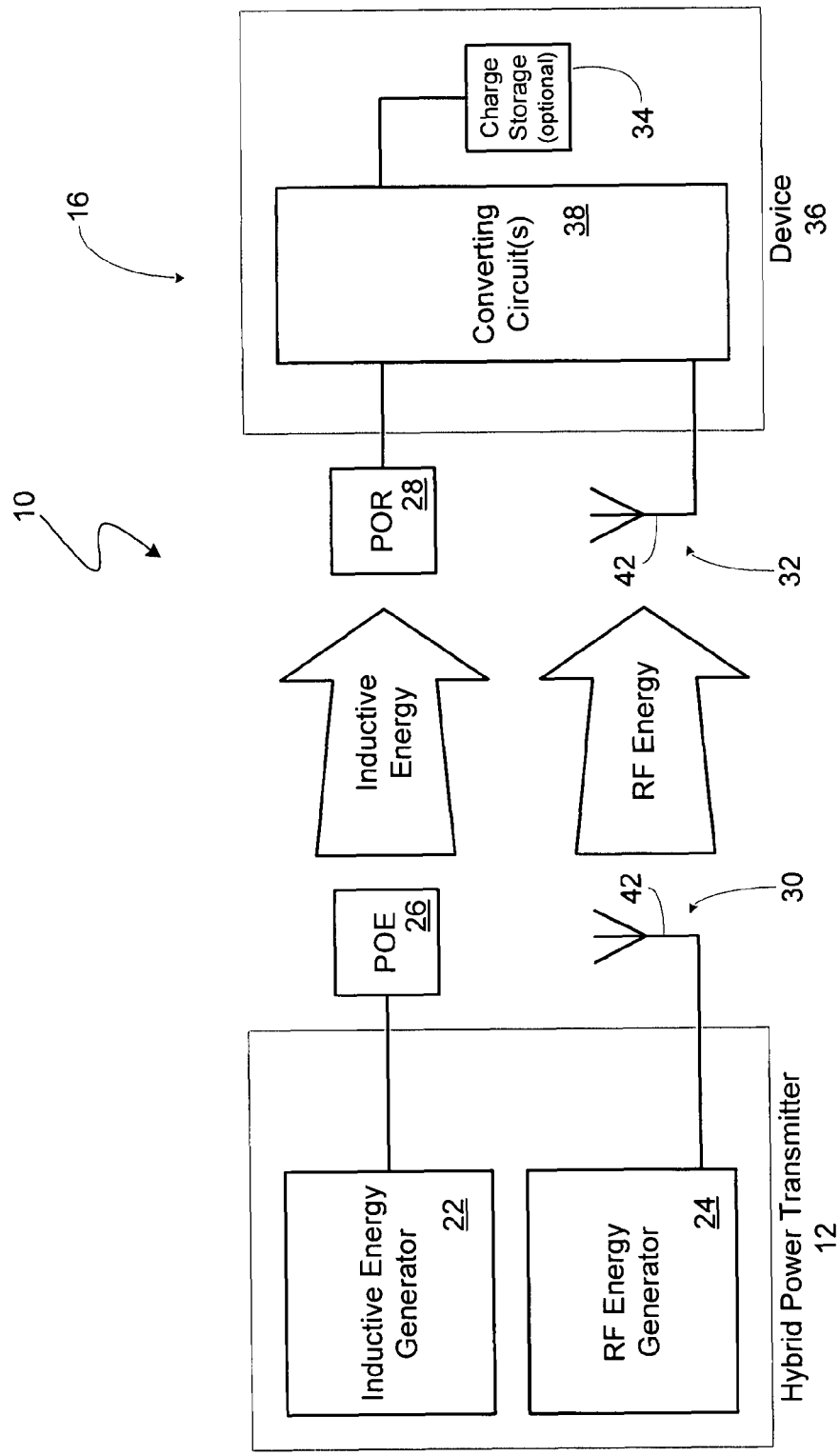
FIG. 5 is an illustration of a hybrid power system using inductive and RF energy.
Figure 6:
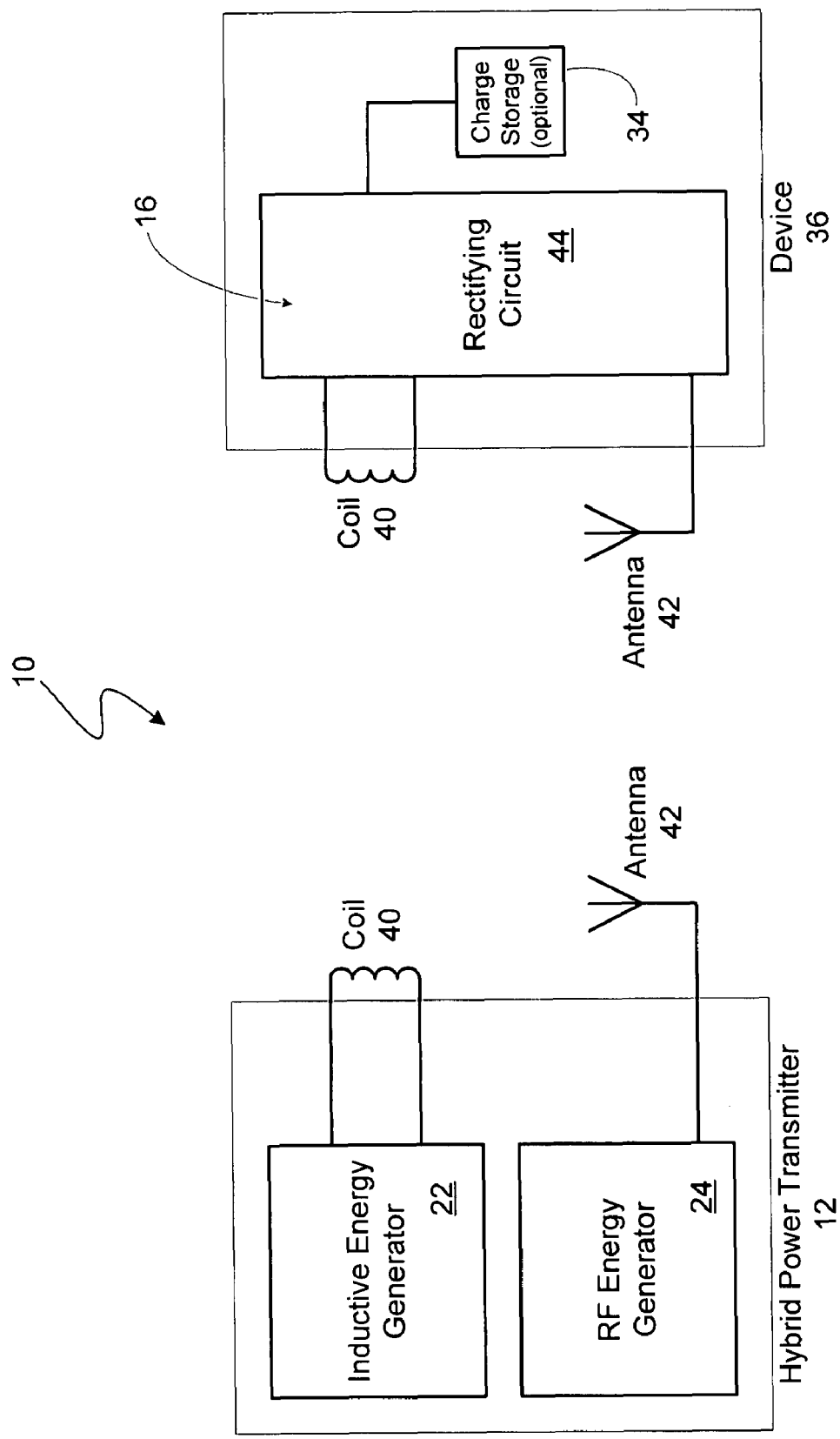
FIG. 6 is an illustration of a hybrid power system using inductive and RF energy transmitted through a coil and antenna respectively.
Figure 7:
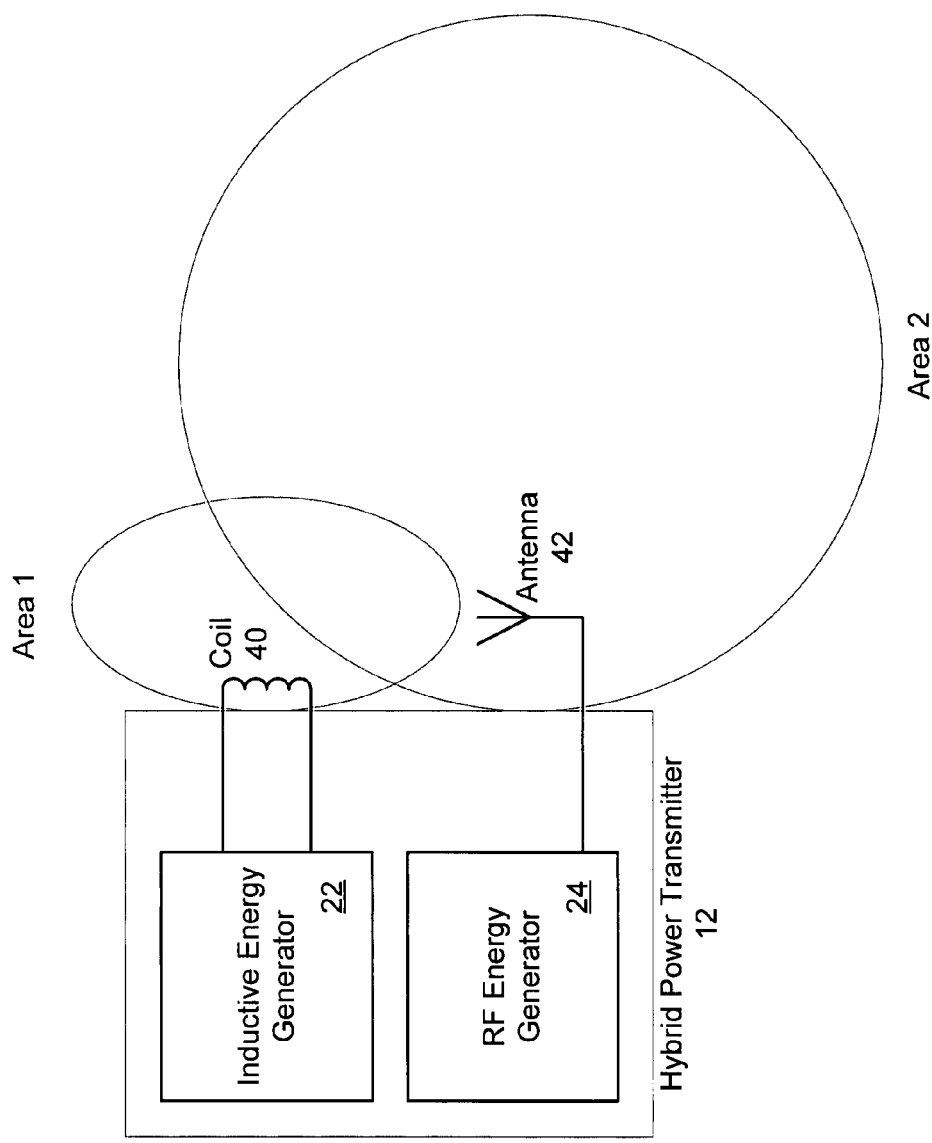
FIG. 7 is an illustration of a hybrid power system using inductive and RF energy transmitted through a coil and antenna respectively. Coverage areas are shown for both energy types.

Referring to FIG. 5, the present invention is an apparatus for supplying power to a device 36. The device 36 may be charged, re-charged, or directly powered by the apparatus. The apparatus includes a hybrid power transmitter 12 for generating RF and magnetic inductive (magnetic field) energy. The hybrid power transmitter 12 includes two different generators for generating both RF and inductive power. These generators are independently connected to two different POEs 26, 30. FIG. 6 shows the POEs 26, 30 implemented as a coil 40 and an antenna 42. A near-field (inductive) coil 40 (antenna 42) is connected to the inductive energy generator included in the hybrid power transmitter 12 and radiates power at a first frequency to a near-field coverage area. A far-field antenna 42 (antenna) is connected to the RF energy generator included in the hybrid power transmitter 12 and radiates power at a second frequency, which may be equal to the first frequency, to a far-field coverage area. Both coverage areas can be seen in FIG. 7. The device 36 to be powered includes one or more rectifying circuits 44 configured to harvest the power from the apparatus.

When the device 36 is in close proximity to the apparatus (i.e., in the near-field coverage area), power is received mostly from the near-field antenna 42. In this situation, the apparatus supplies fast charging to the device 36. The power obtained from inductive charging (near-field) decreases as a function of distance by a factor of approximately $1/r^6$, where r is the distance from the apparatus to the device 36.

When the device 36 is not in close proximity to the apparatus (i.e., in the far-field coverage area), power is received primarily from the far-field antenna 42. In this situation, the apparatus supplies a trickle charge to the device 36. The power obtained from far-field charging decreases as a function of distance by a factor of approximately $1/r^2$, where r is the distance from the apparatus to the device 36.

The near-field coverage area and the far-field coverage area may overlap to define an overlap coverage area. In the overlap coverage area, power is received from both the near-field and the far-field antennas 42. Overlapping coverage areas can be seen in FIG. 7.

Since the apparatus transmits power in both the near-field and the far-field regions, the device 36 may be located at varying distances from the apparatus and still receive power. For example, near-field (inductive) charging may be employed at communications areas, such as doorways for door access. Far-field charging may be employed to cover hallways in order to supply sleep current and added functionality, such as random pinging for location identification of a device 36 or inventory count.

Figure 8:
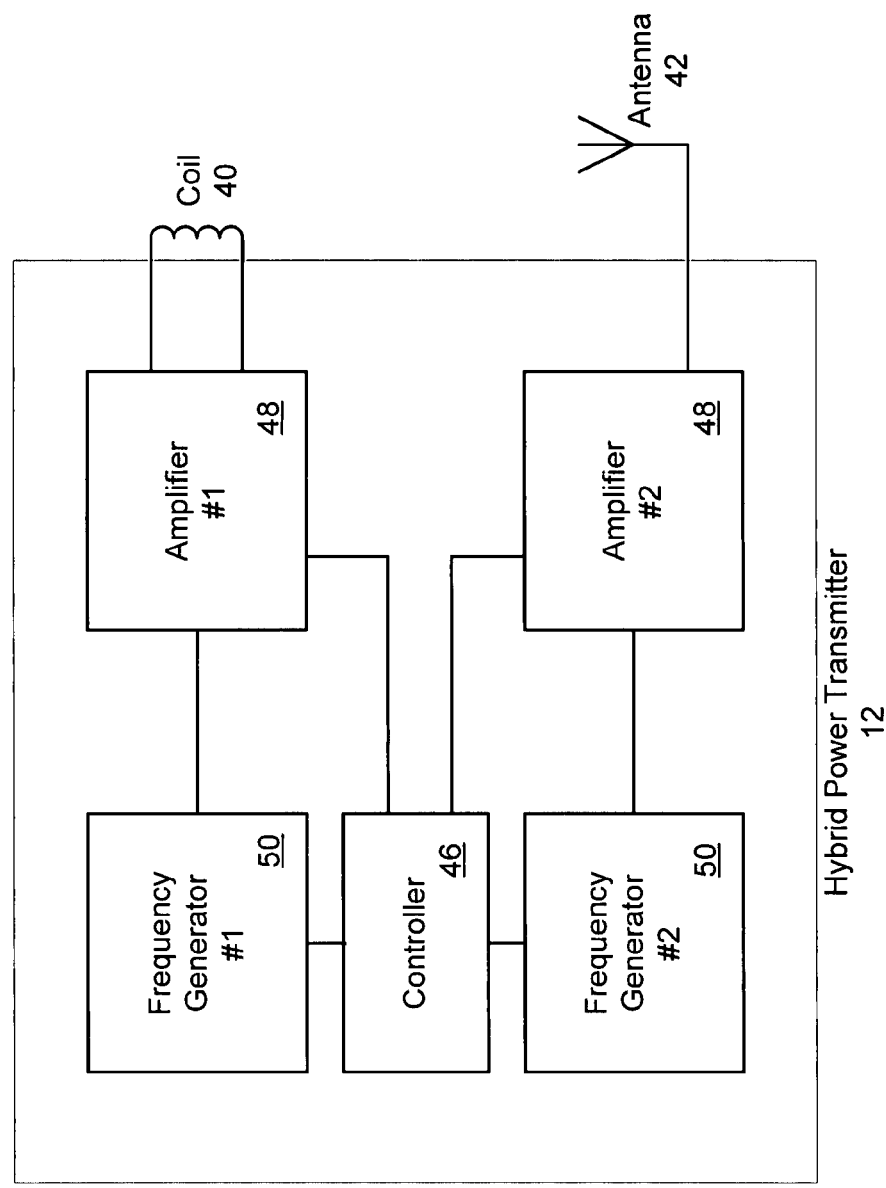
FIGS. 8-16 are illustrations of variations of hybrid power transmitters according to the present invention.

Referring to FIG. 8 and expanding on the embodiment illustrated in FIG. 6, the hybrid power transmitter 12 includes a first frequency generator 50 connected to the near-field antenna 42 (coil 40). The first frequency generator 50 produces power at a first frequency. A second frequency generator 50 is connected to the far-field antenna 42 and produces power at a second frequency. The first frequency generator 50 and the second frequency generator 50 may each be connected to an amplifier 48.

A controller 46 may be connected to the first frequency generator 50 and/or the second frequency generator 50. The controller 46 may alternatively be connected to the amplifiers 48. The controller 46 determines which antenna 42, if any, transmits power at any given time, via control of the frequency generators 50 and/or the amplifiers 48. The controller 46 may pulse power from the coil 40 and/or from the antenna 42. Pulsing of an RF power transmitter has been described in detail in U.S. patent application Ser. No. 11/356,892 and U.S. Provisional Application 60/758,018, both incorporated by reference herein.

Figure 9:
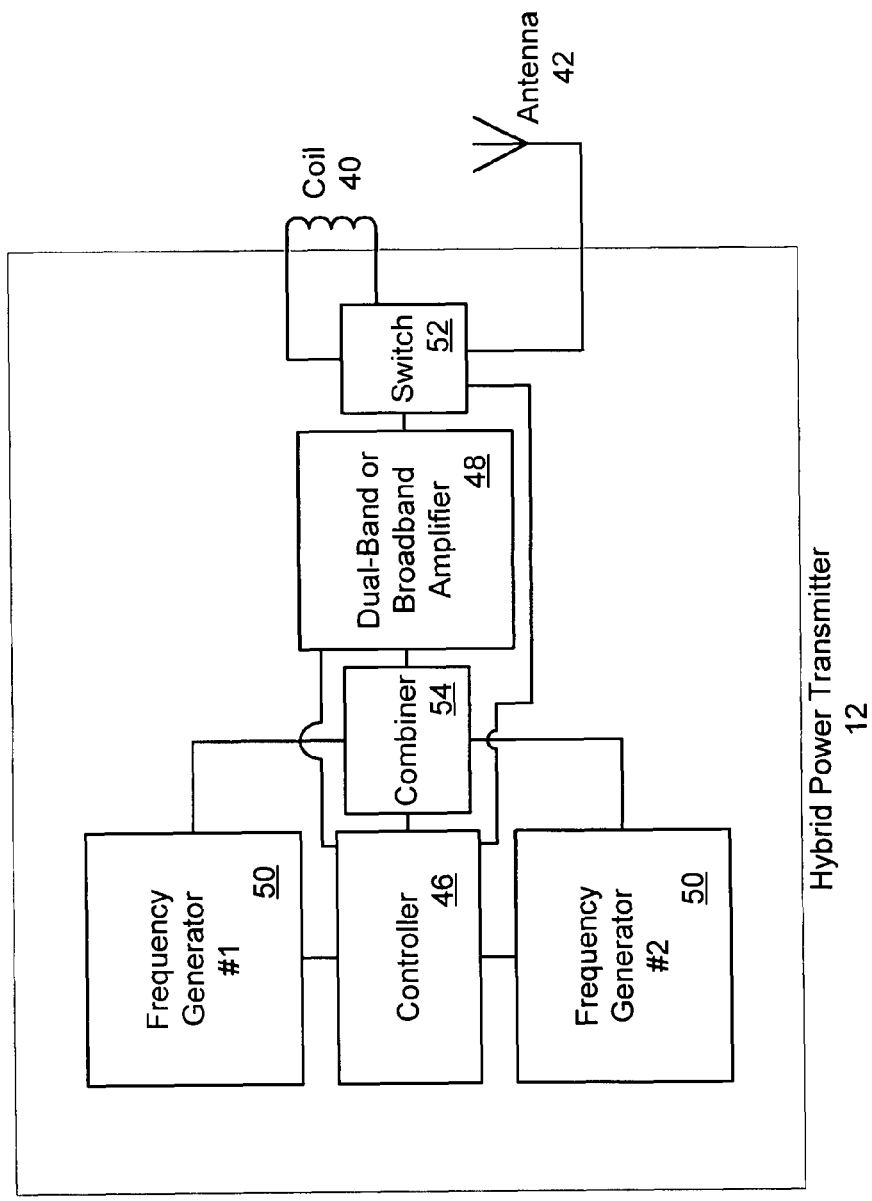

Referring to FIG. 9 and expanding on the embodiment illustrated in FIG. 6, the hybrid power transmitter 12 includes a first frequency generator 50 connected to a combiner 54. The first frequency generator 50 produces power at a first frequency. A second frequency generator 50 is also connected to the combiner 54 and produces power at a second frequency. The combiner 54 is connected to a switch 52. An amplifier 48 may be located between the combiner 54 and the switch 52. The near-field and the far-field antennas 42 are connected to the switch 52.

The combiner 54 combines the power at the first frequency and the power at the second frequency into one transmission to the switch 52. Depending on the position of the switch 52, power is transmitted to only the antenna 42 or coil 40 or neither at any given time. This enables the apparatus to pulse power from the near-field antenna 42, the far-field antenna 42, or both. It should be noted that the antenna 42 and coil 40 may be designed to discriminate the frequency of the other element. As an example, the antenna 42 may have a high impedance at the second frequency while the antenna 42 is impedance matched at the first frequency. The result is that the antenna 42 will transmit little or no energy at the second frequency and will only transmit at the first frequency. The same discriminating feature may be designed into the coil 40 for the first frequency meaning it would only transmit the second frequency. It should also be noted that an additional switch 52 may be incorporated to select which frequency generator 50 is connected to the amplifier 48 which would eliminate the need for a combiner 54.

A controller 46 may be connected to the first and second frequency generators 50, the amplifier 48, and/or the switch 52. The controller 46 determines which antenna 42/coil 40, if any, transmits power at any given time, via control of the frequency generators 50, the amplifier 48, or the switch 52.

An in-line circulator may be connected between the switch 52 and the amplifier 48. This protects the amplifier 48 from seeing any reflections produced by the switch 52 due to mismatch. The circulator re-routes any reflections or feedback to a matched load where the reflections are dissipated as heat.

Figure 10:
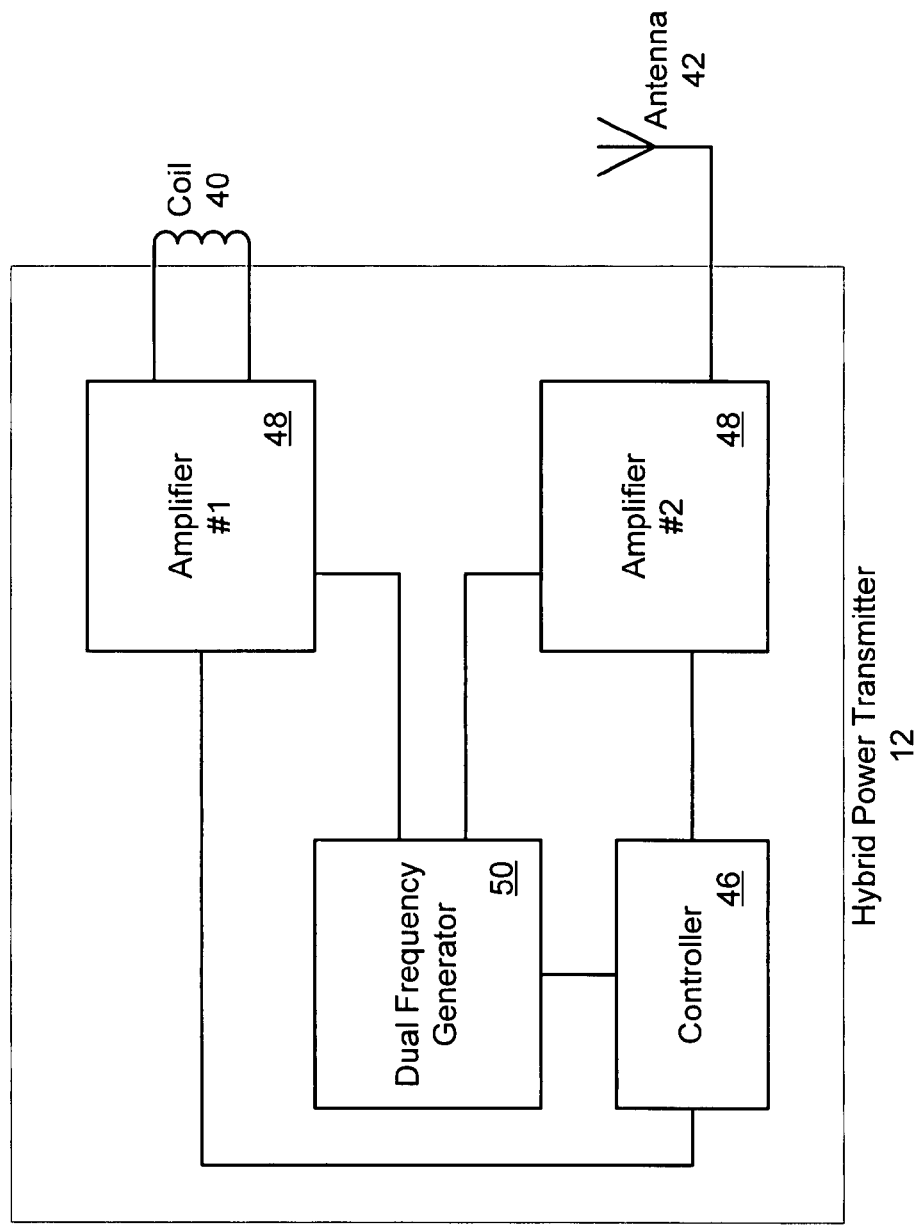

Referring to FIG. 10 and expanding on the embodiment illustrated in FIG. 6, the hybrid power transmitter 12 includes a dual frequency generator 50. The near-field antenna 42 (coil 40) and the far-field antenna 42 (antenna) are connected to the dual frequency generator 50. The dual frequency generator 50 transmits power at a first frequency to the near-field antenna 42 and power at a second frequency to the far-field antenna 42. The near-field antenna 42 and the far-field antenna 42 may connect to the dual frequency generator 50 via amplifiers 48.

A controller 46 may be connected to the dual frequency generator 50 and/or to the amplifiers 48. The controller 46 determines which antenna 42/coil 40, if any, transmits power at any given time, via control of the dual frequency generator 50 and/or the amplifiers 48.

Figure 11:
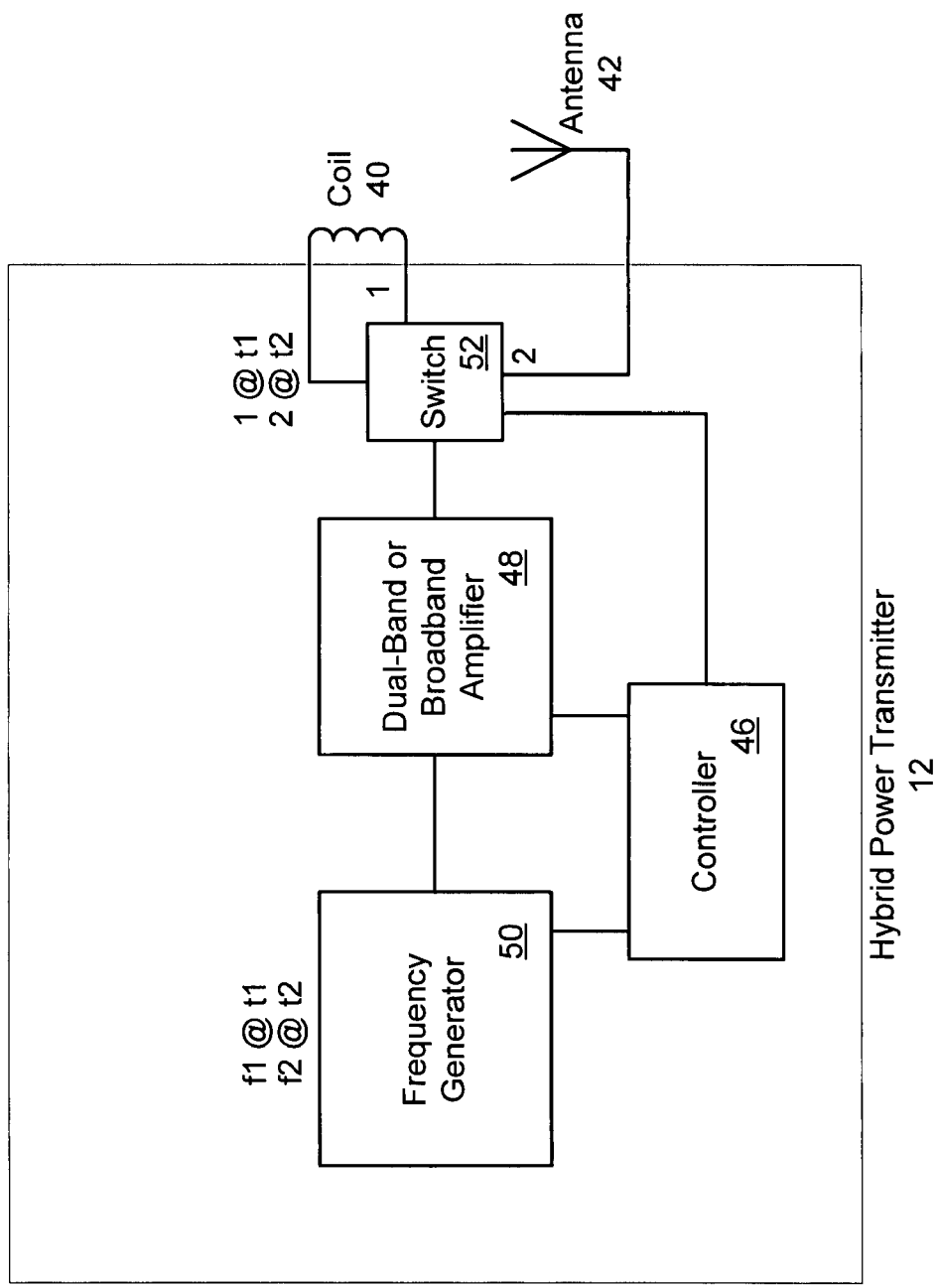

Referring to FIG. 11 and expanding on the embodiment illustrated in FIG. 6, the hybrid power transmitter 12 may include a controller 46 to control the output of a frequency generator 50. The controller 46 may change the output frequency of the frequency generator 50, change the gain on the amplifier 48, and/or switch between the output antenna 42 and coil 40. During time period, $t_1$, the controller 46 may set the frequency generator 50 to frequency, $f_1$, and also control the switch 52 to route the output of the amplifier 48 to position 1 (the antenna 42). Likewise, during time period, $t_2$, the controller 46 may set the frequency generator 50 to frequency, $f_2$, and also control the switch 52 to route the output of the amplifier 48 to position 2 (the coil 40). The output of the frequency generator 50 may be connected to a dual band or broadband amplifier 48.

Figure 12:
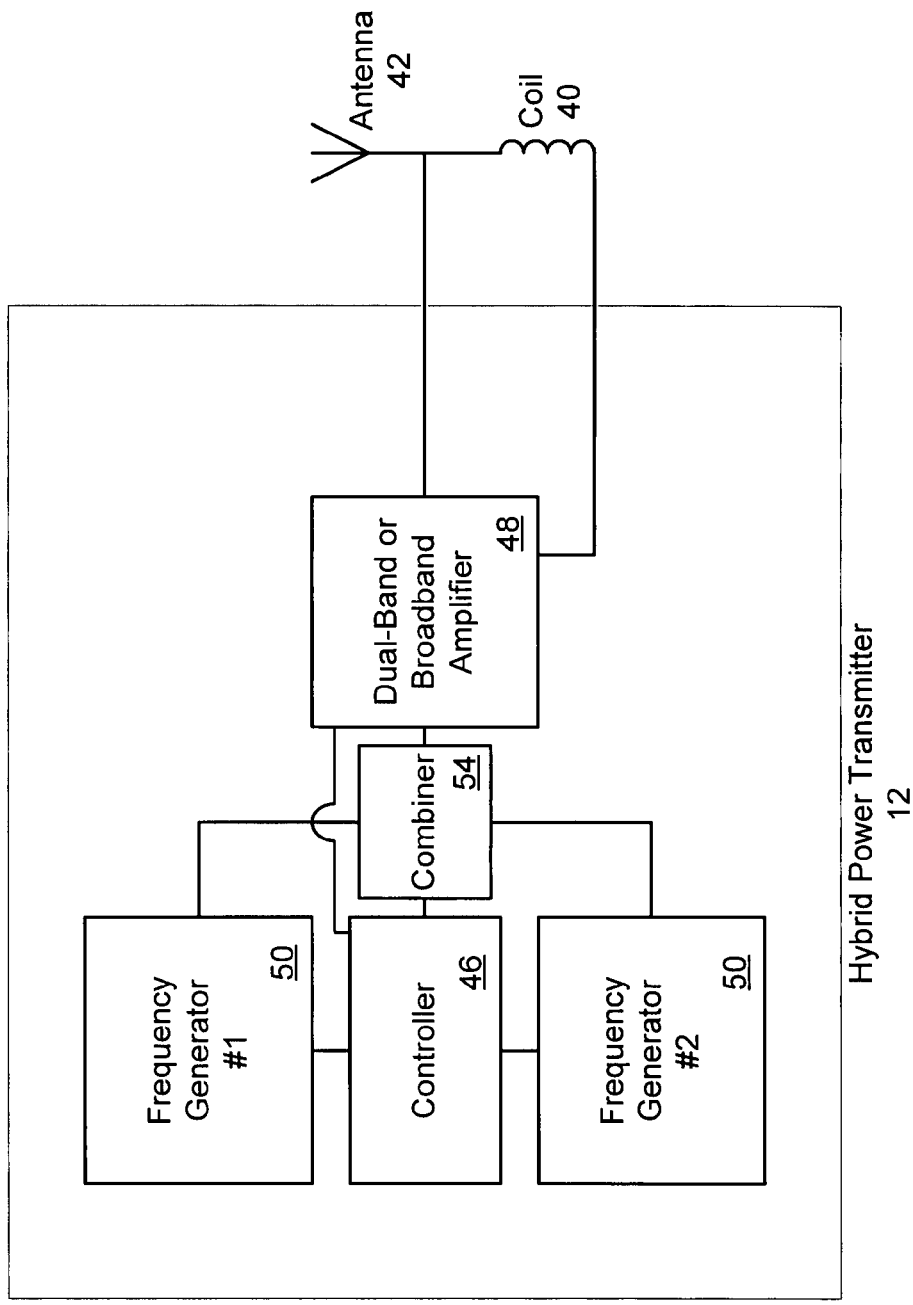

Referring to FIG. 12 and expanding on the embodiment illustrated in FIG. 6, the hybrid power transmitter 12 may include two frequency generators 50. The output of the two frequency generators 50 may be connected to a combiner 54 in order to combine the frequencies. The combined frequencies may be connected to a dual band or broadband amplifier 48 or connected directly to the antenna 42 and coil 40. This embodiment eliminates the switch 52. The antenna 42 and coil 40 are connected together and matched in such a way that they do not interfere with one another. A controller 46 may be connected to the first and second frequency generators 50, the amplifier 48, and/or the combiner 54. The controller 46 determines which antenna 42/coil 40, if any, transmits power at any given time, via control of the frequency generators 50, the amplifier 48, or the combiner 54. It should be noted that the antenna 42 and coil 40 may be designed to discriminate the frequency of the other element as previously described.

Figure 13:
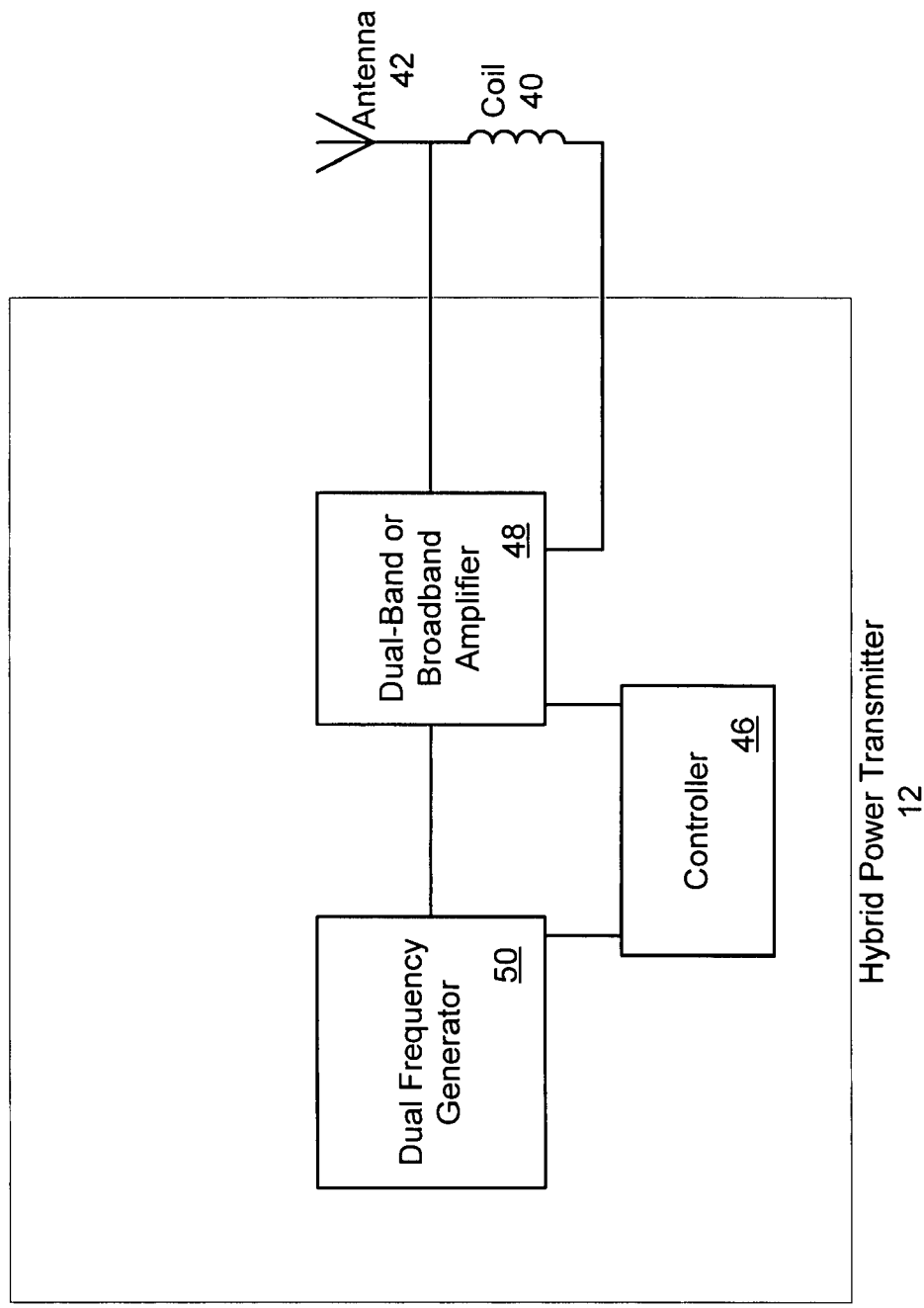

Referring to FIG. 13 and expanding on the embodiment illustrated in FIG. 6, the hybrid power transmitter 12 may be implemented with a dual frequency generator 50. The output of the dual frequency generator 50 contains frequency components at two frequencies. The output of the dual frequency generator 50 may be connected to a dual band or broadband amplifier 48 or may be directly connected to the antenna 42 and coil 40. This embodiment eliminates the switch 52. The antenna 42 and coil 40 are connected together and matched in such a way that they do not affect the operation of one another. A controller 46 may be included to control the transmission of energy by controlling the frequency generator 50 and/or amplifier 48. It should be noted that the antenna 42 and coil 40 may be designed to discriminate the frequency of the other element as previously described.

Figure 14:
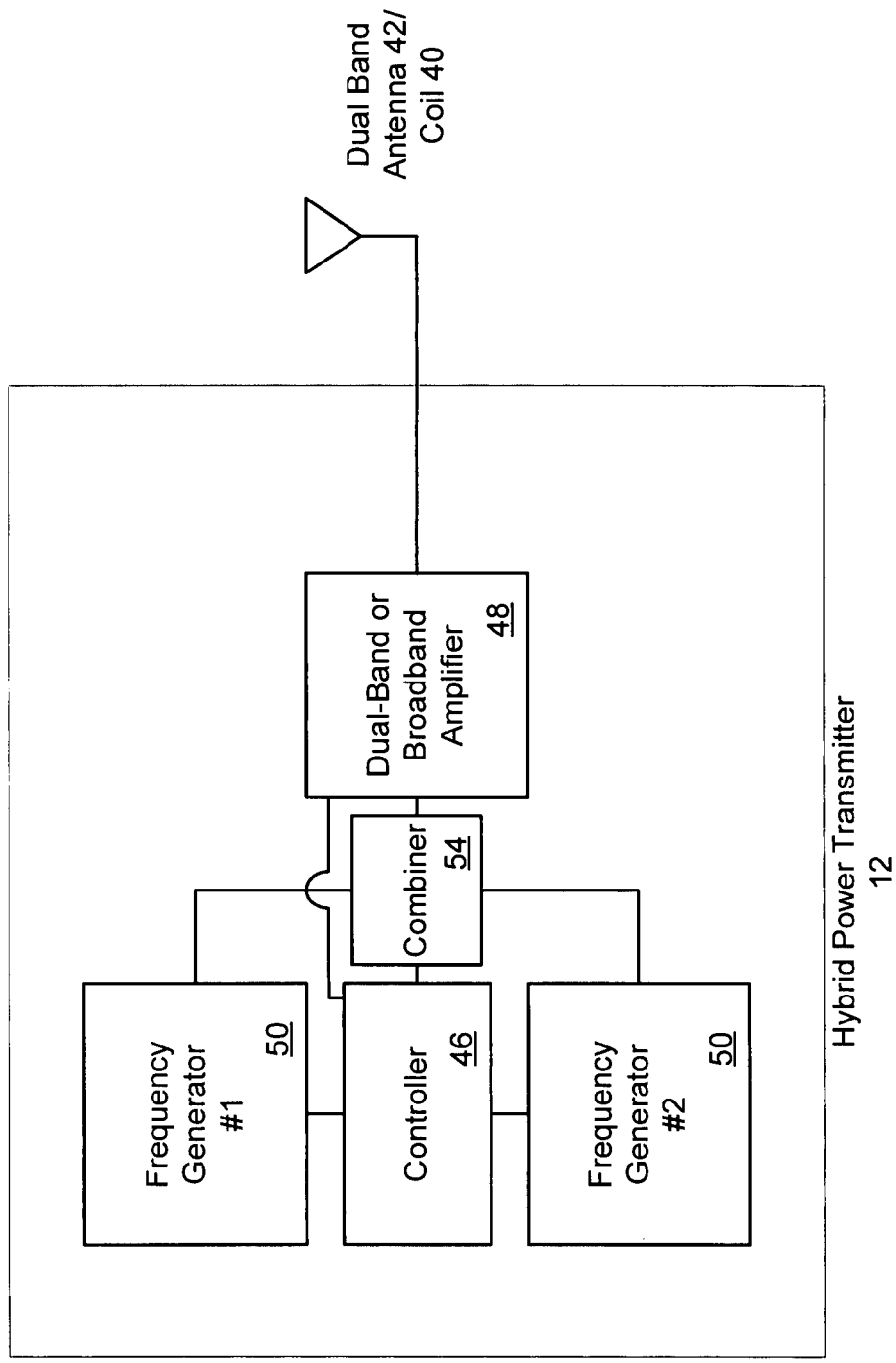

Referring to FIG. 14 and expanding on the embodiment illustrated in FIG. 6, the hybrid power transmitter 12 may be implemented with a dual band antenna 42/coil 40. The dual band antenna 42/coil 40 may be designed to transmit both RF and magnetic energy from the same antenna 42/coil 40 structure (i.e. has two resonant frequencies). The frequency generator 50, combiner 54, amplifier 48, and controller 46 may be implemented as described for FIG. 12.

Figure 15:
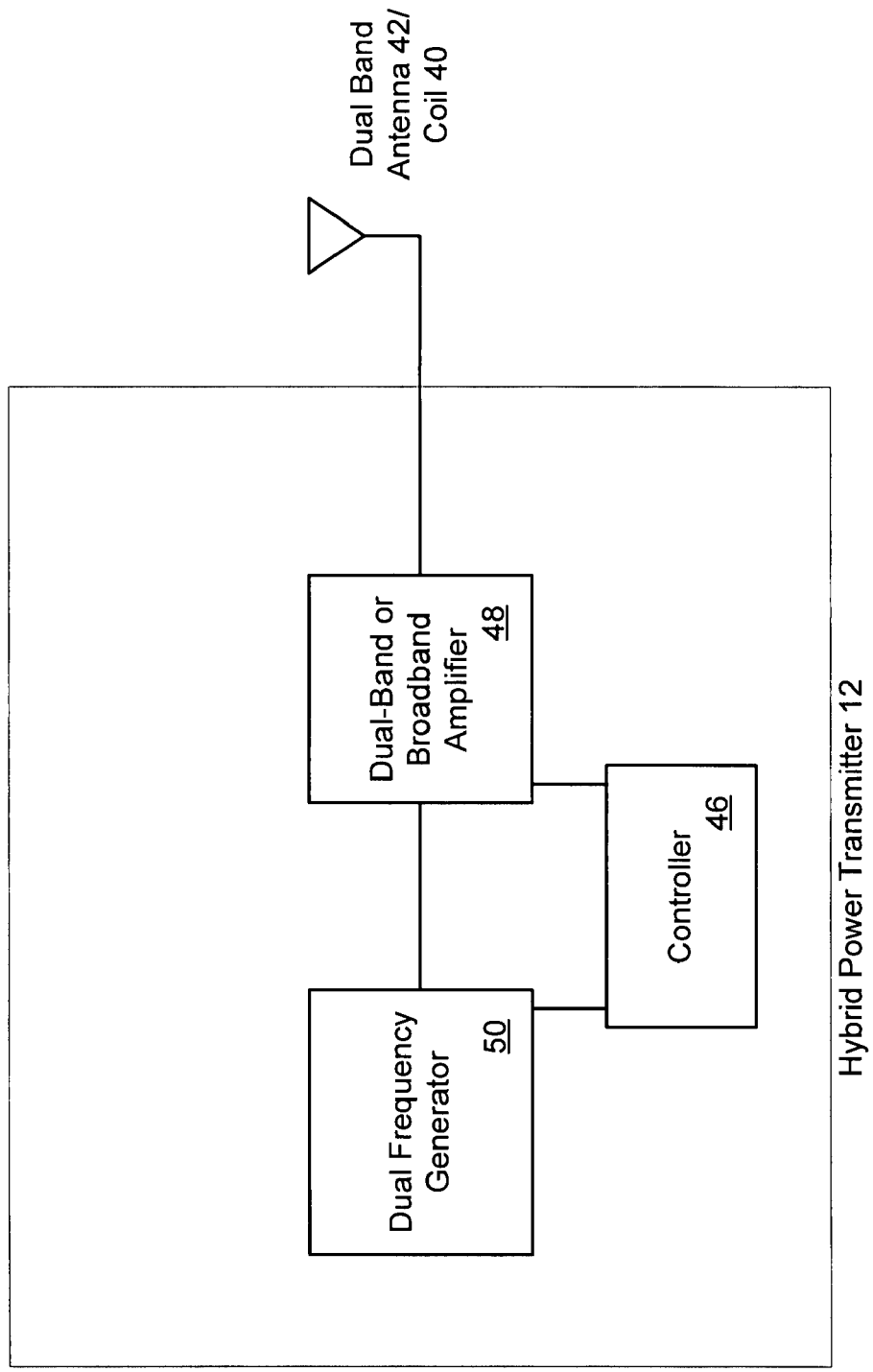

Referring to FIG. 15 and expanding on the embodiment illustrated in FIG. 6, the hybrid power transmitter 12 may be implemented with a dual band antenna 42/coil 40. The dual band antenna 42/coil 40 may be designed to transmit both RF and magnetic energy from the same antenna 42/coil 40 structure (i.e. has two resonant frequencies). The frequency generator 50, combiner 54, amplifier 48, and controller 46 may be implemented as described for FIG. 13.

Figure 16:
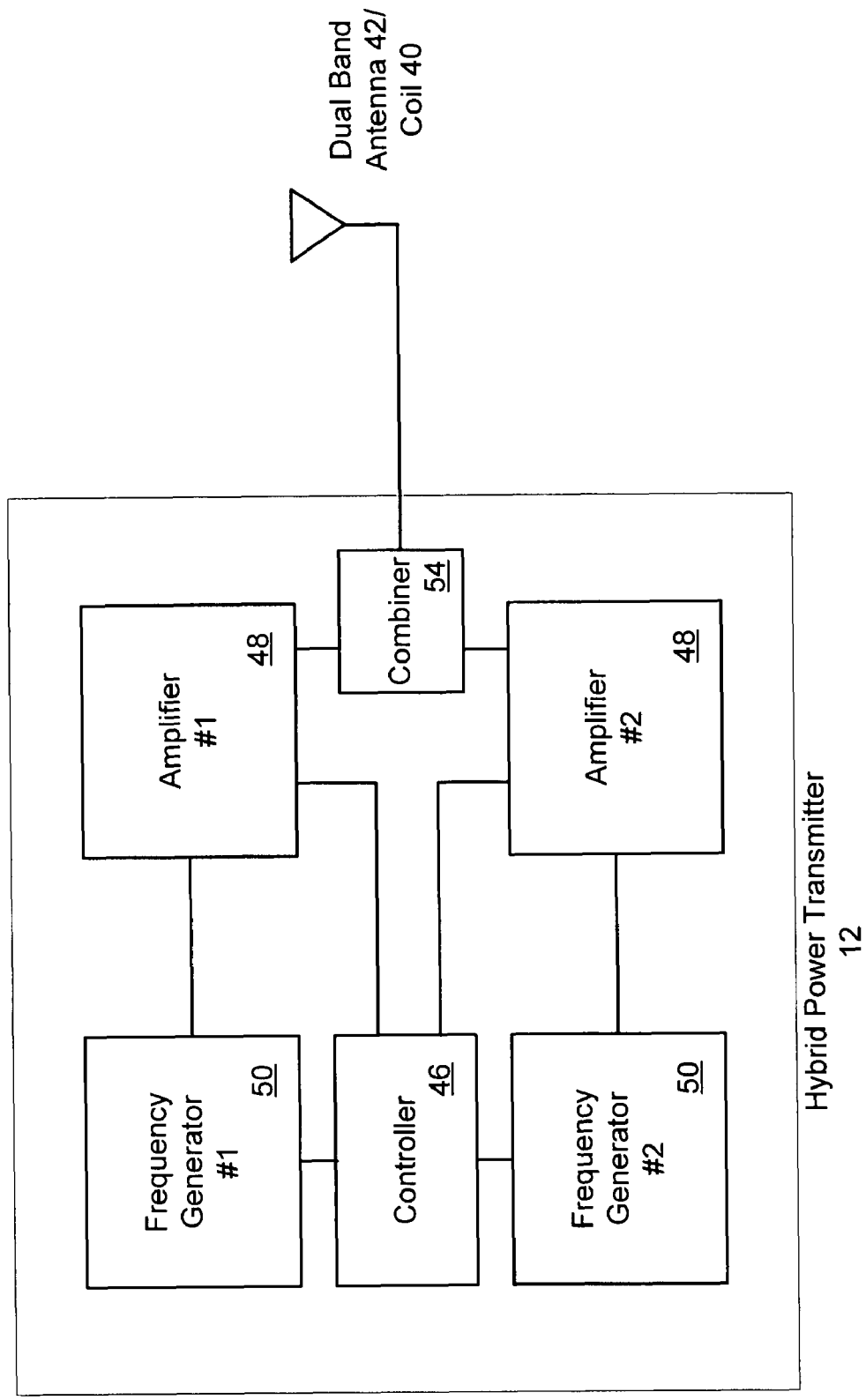

Referring to FIG. 16 and expanding on the embodiment illustrated in FIG. 6, the hybrid power transmitter 12 may be implemented with a dual band antenna 42/coil 40. The dual band antenna 42/coil 40 may be designed to transmit both RF and magnetic energy from the same antenna 42/coil 40 structure (i.e. has two resonant frequencies). The hybrid power transmitter 12 may be implemented with a first frequency generator 50 connected to a first amplifier 48 where the output of the amplifier 48 is connected to a combiner 54. A second frequency generator 50 is connected to a second amplifier 48 where the output of the amplifier 48 is connected to a combiner 54. The combiner 54 outputs a combined power signal to the dual band antenna 42/coil 40. A controller 46 may be included to control the transmission of energy by controlling the frequency generators 50 and/or amplifiers 48.

A dual band antenna 42/coil 40 may be implemented with a broadband antenna 42, such as, but not limited to, a log periodic, helical, fractal, or any other antenna 42 with broadband or dual band characteristics. The dual band antenna 42/coil 40 preferably has a single input/output (depending on whether transmitting or receiving energy) into which a signal containing at least two frequency components (one for RF energy and one for inductive energy) is feed/received. A single dual band rectifier may be used with the dual band antenna 42/coil 40 or separate rectifiers may be used and the frequency components supplied from the dual band antenna 42/coil 40 may be separated and sent to the appropriate rectifier.

Figure 17:
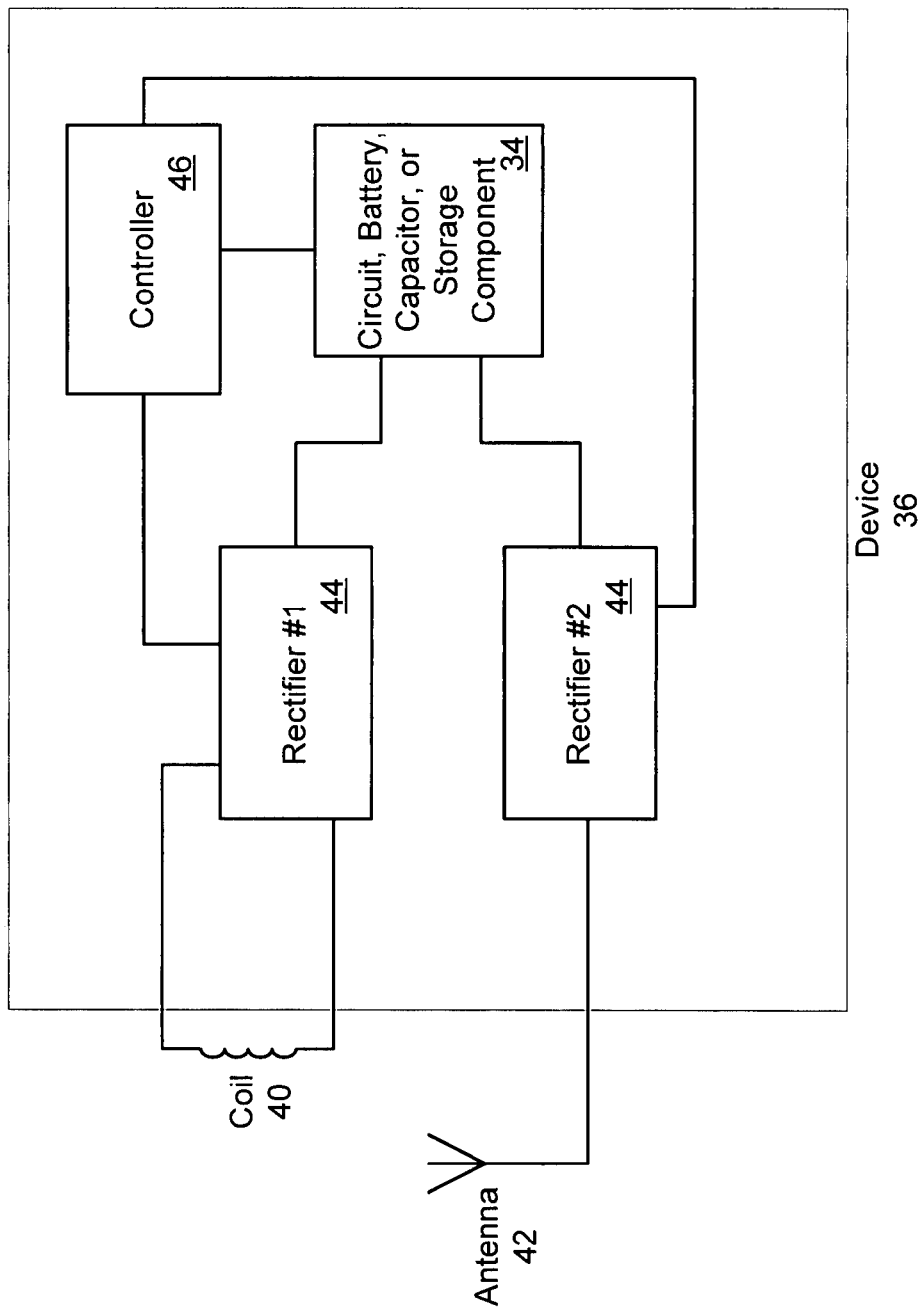
FIGS. 17-20 are illustrations of variations of hybrid power receivers according to the present invention.

Referring to FIG. 17 and expanding on the embodiment illustrated in FIG. 6, the hybrid power receiver 14 may be implemented with two separate rectification circuits. The first rectification circuit (rectifier #1) is connected to the coil 40 for receiving and converting magnetic energy. The second rectification circuit (rectifier #2) is connected to the antenna 42 for receiving and converting RF energy. The outputs of the rectification circuits are connected to the circuit, battery, capacitor, and/or charge storage 34 component. The hybrid power receiver 14 may also include a controller 46 for controlling the rectification circuits.

Figure 18:
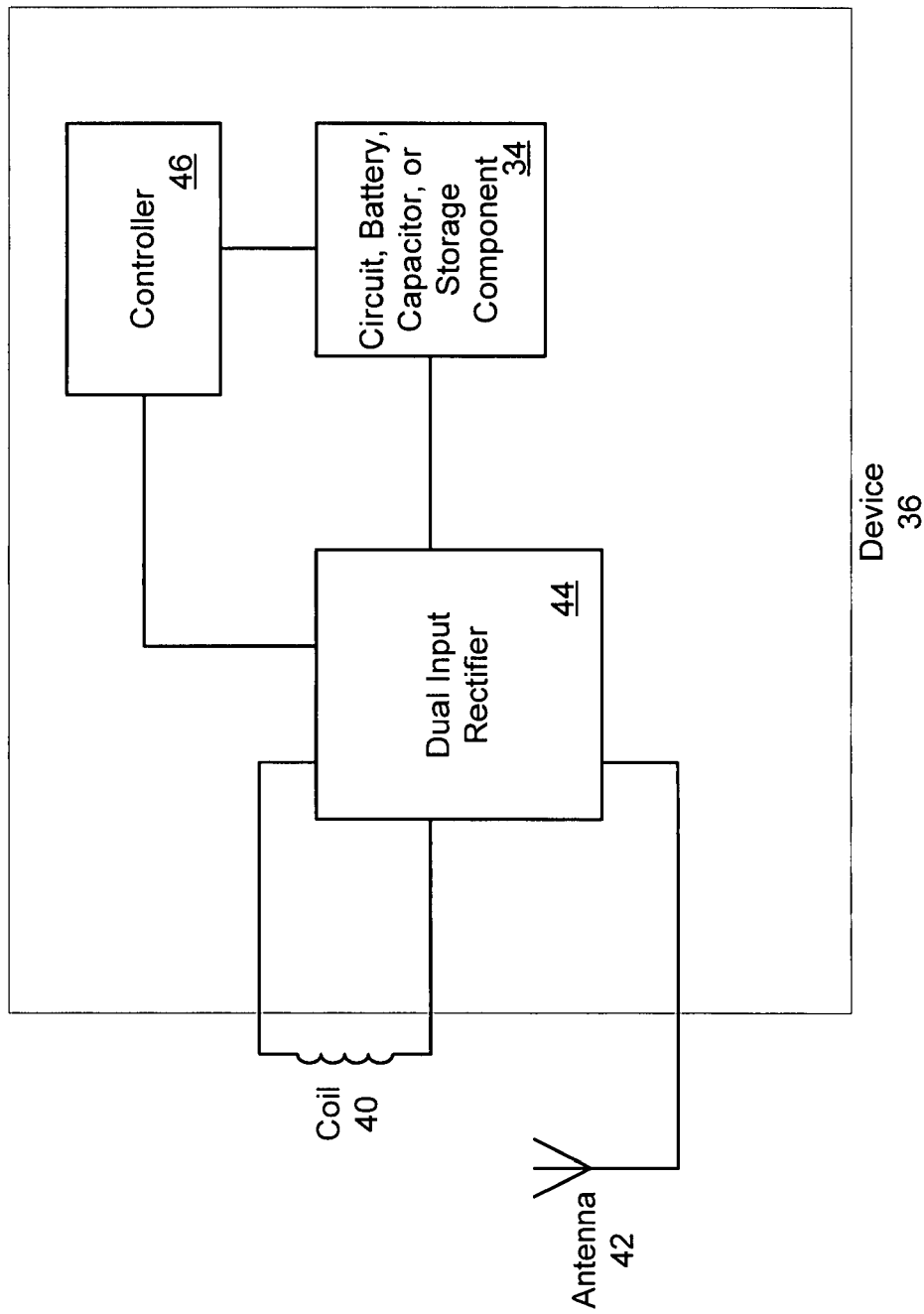

Referring to FIG. 18 and expanding on the embodiment illustrated in FIG. 6, the hybrid power receiver 14 may be implemented with a single rectification circuit with two inputs. The first rectification input is connected to the coil 40 for receiving and converting magnetic energy. The second rectification input is connected to the antenna 42 for receiving and converting RF energy. The output of the rectification circuit is connected to the circuit, battery, capacitor, and/or charge storage 34 component. The hybrid power receiver 14 may also include a controller 46 for controlling the rectification circuit and/or the circuit, battery, capacitor, and/or charge storage 34 component.

Figure 19:
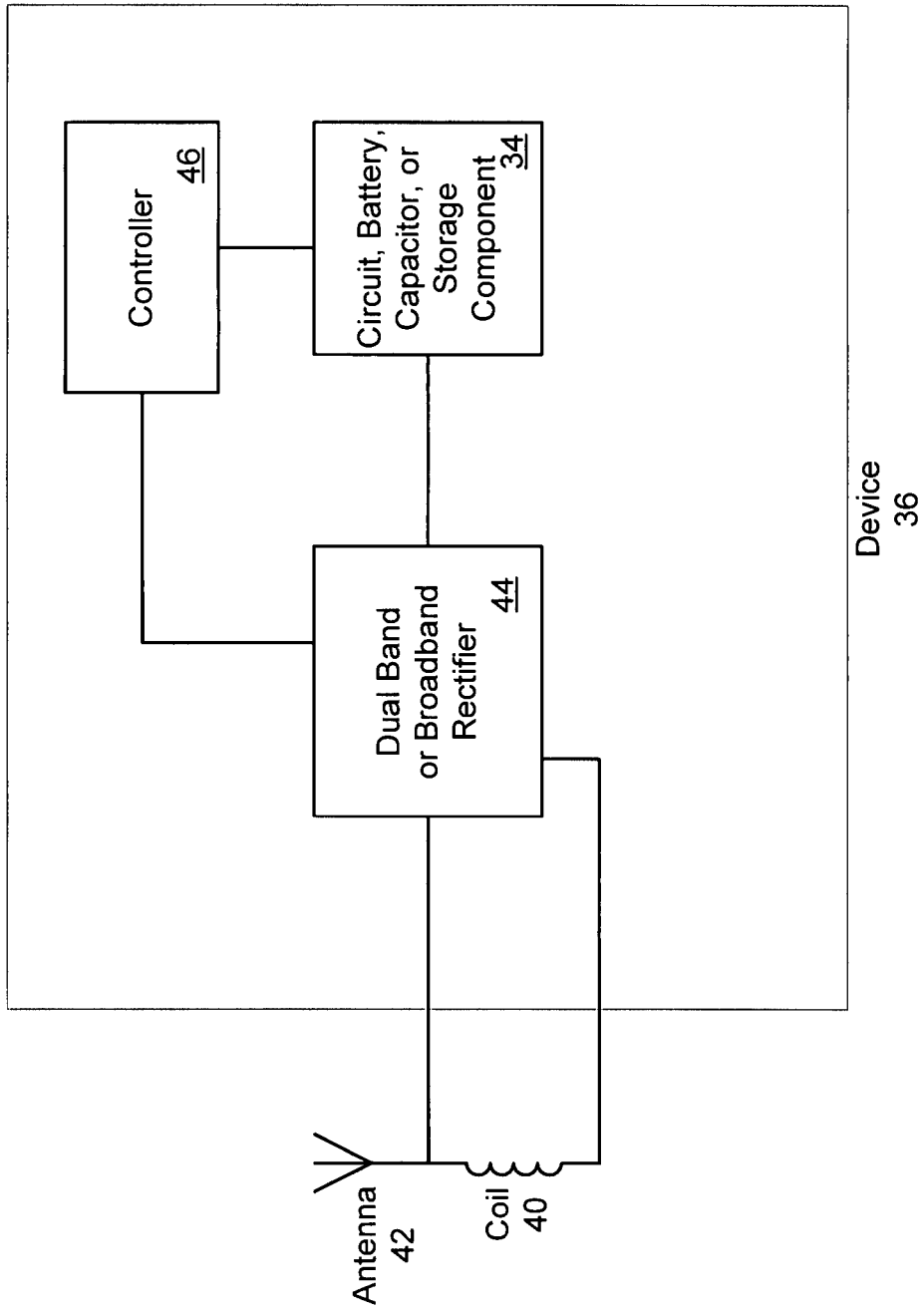
Figure 20:
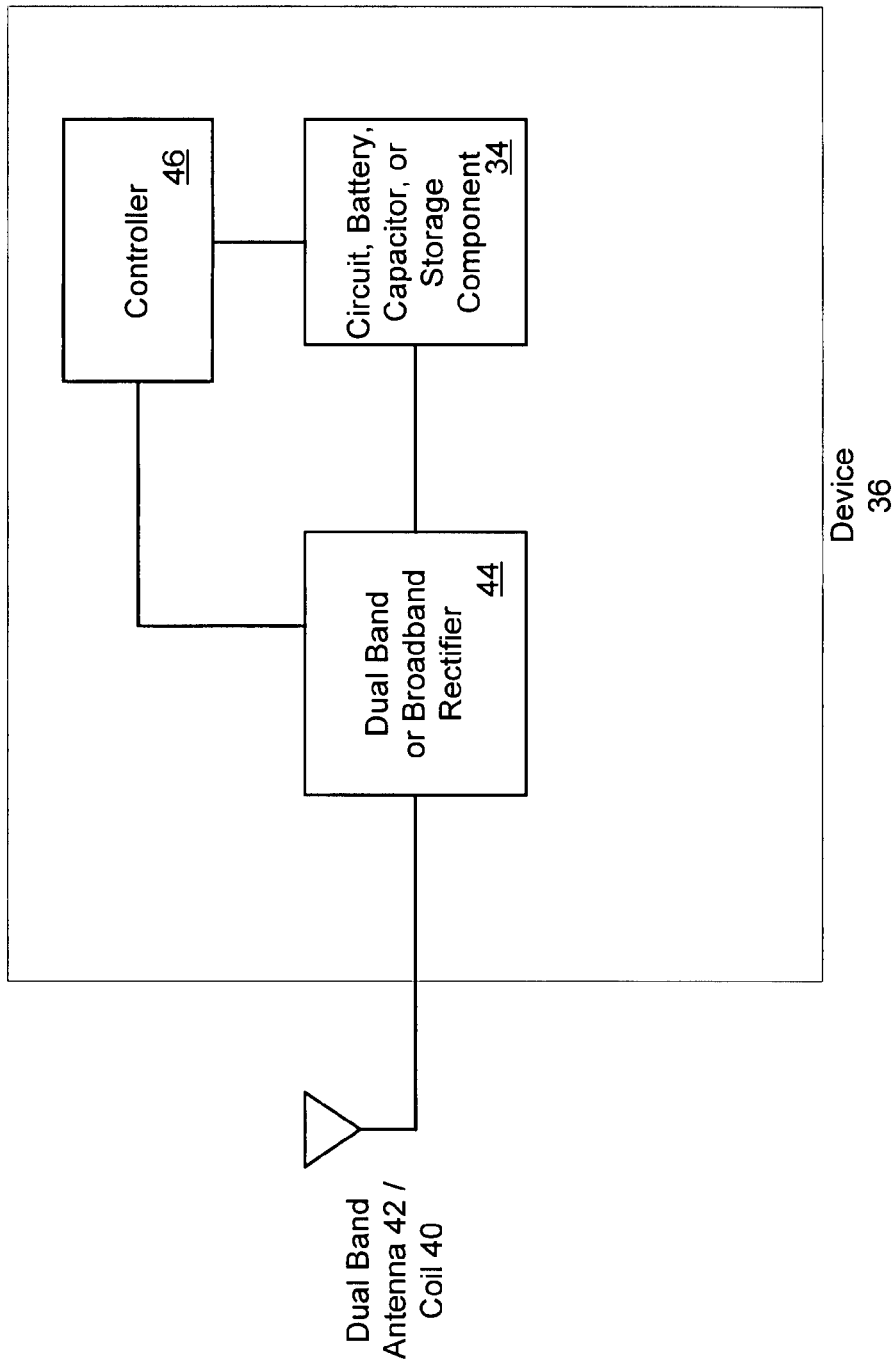

Referring to FIG. 19 and FIG. 20 and expanding on the embodiment illustrated in FIG. 6, the hybrid power receiver 14 may be implemented with a dual band or broadband rectification circuit. The output of the dual band or broadband rectification circuit is connected to the device 36, battery, capacitor, and/or charge storage 34 component. The hybrid power receiver 14 may also include a controller 46 for controlling the dual band or broadband rectification circuit and/or the circuit, battery, capacitor, and/or charge storage 34 component. Referring to FIG. 19, the dual band or broadband rectification circuit is connected to both the antenna 42 and the coil 40. The impedance of the coil 40 would be designed to not affect the operation of the antenna 42 and vice versa. Additionally, the impedance of the coil 40 may be used to help impedance match the antenna 42 to the dual band or broadband rectification circuit and vice versa. Referring to FIG. 20, a dual band or broadband antenna 42/coil 40 is connected to the dual band or broadband rectification circuit for capturing both magnetic and electromagnetic energy.

Figure 21:
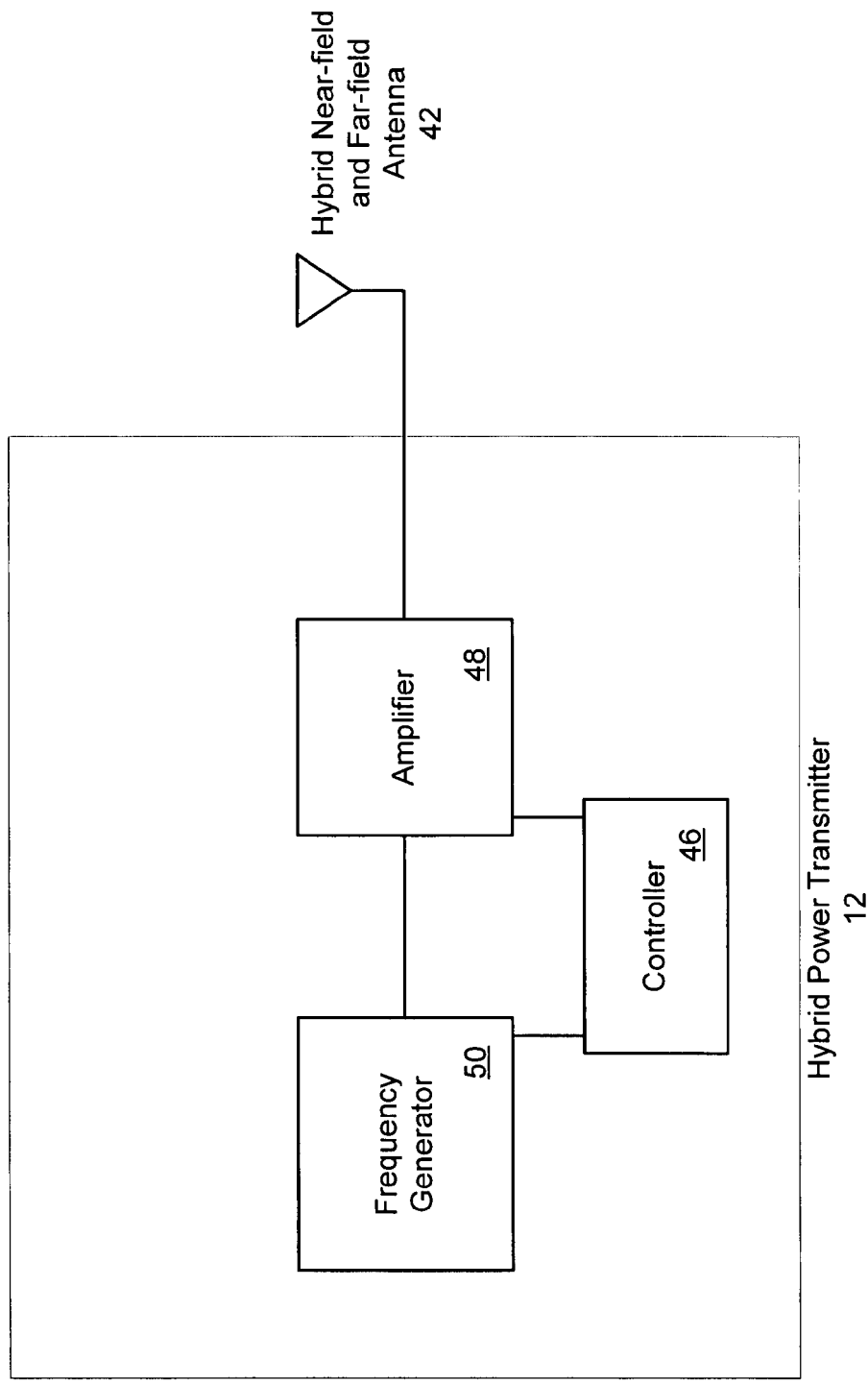
FIGS. 21 and 22 are illustrations of hybrid power transmitter and hybrid power receiver using hybrid near-field and far-field antennas.
Figure 22:
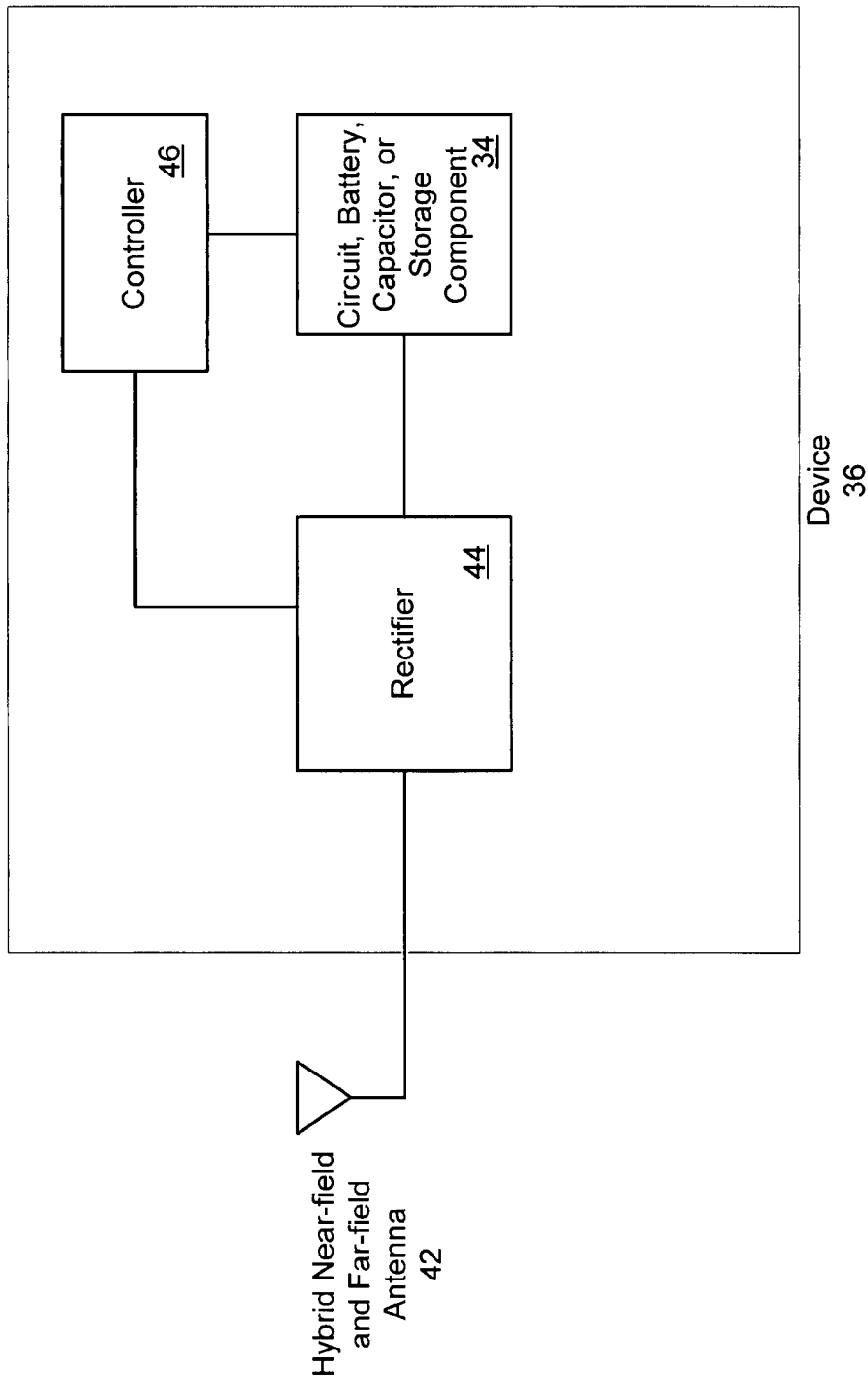

Referring to FIG. 21 and FIG. 22, any of the hybrid power transmitter 12 and/or the hybrid power receiver 14 previously described may be designed to use a hybrid near-field and far-field antenna 42. The hybrid near-field and far-field antenna 42 may have one or two input/output ports. The hybrid near-field and far-field antenna 42 is designed to be a single structure containing both a magnetic and electromagnetic transmitting/capturing apparatus.

Figure 23:
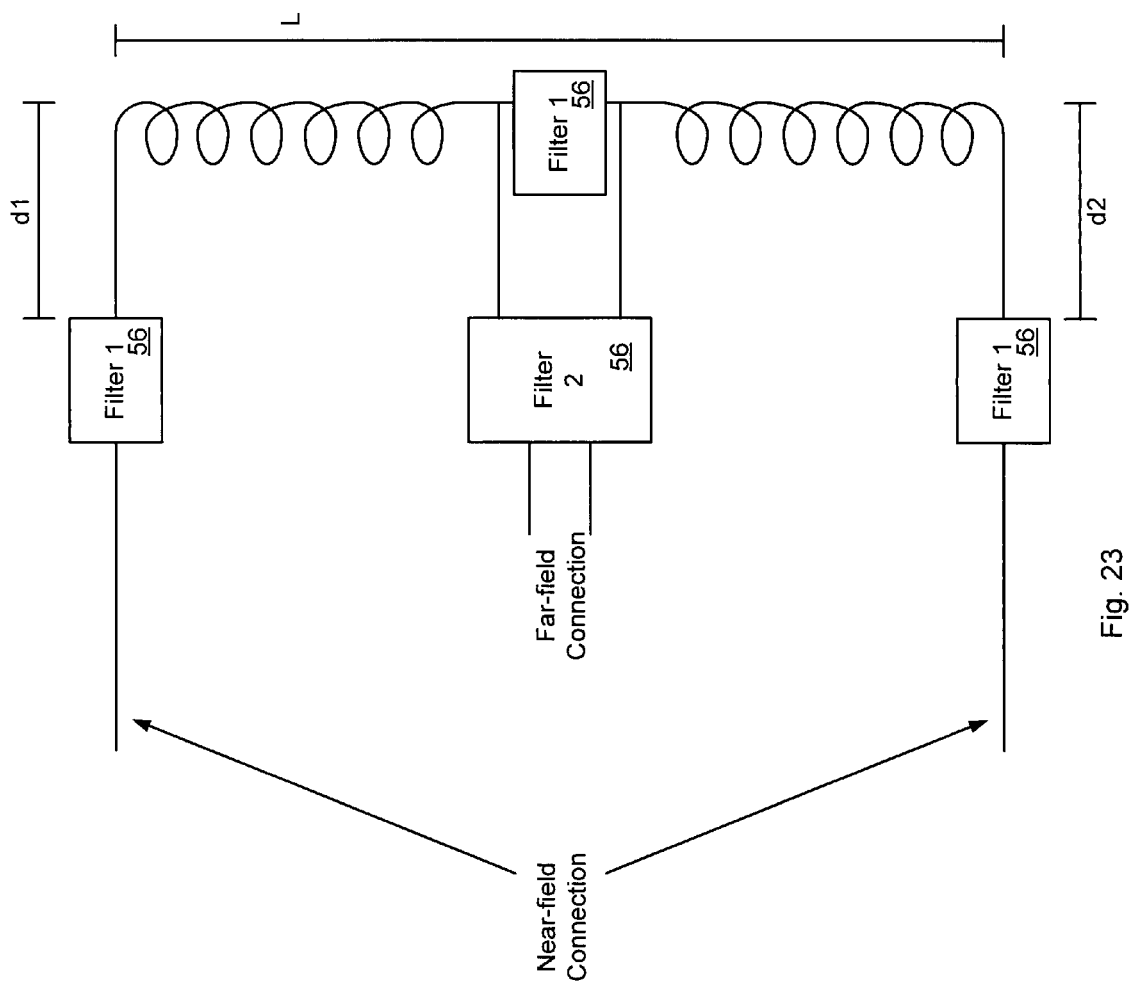
FIGS. 23-26 are illustrations of antennas according to the present invention.

Referring to FIG. 23, the hybrid near-field and far-field antenna 42 contains two ports. The first port is for near-field (magnetic) energy transmission/reception while the second port is for far-field (EM) energy transmission/reception. The antenna 42 structure includes filters to isolate the ports from one another to minimize interference that could degrade the transmission/reception characteristics. Filter 1 passes the frequency of the near-field energy while rejecting the far-field energy. Filter 2 passes the frequency of the far-field energy while rejecting the near-field energy. The antenna 42 may be formed as a coil 40 in order to transmit/receive near-field (magnetic) energy while the antenna 42 acts as a helical antenna 42 in order to transmit/receive far-field energy.

Figure 24:
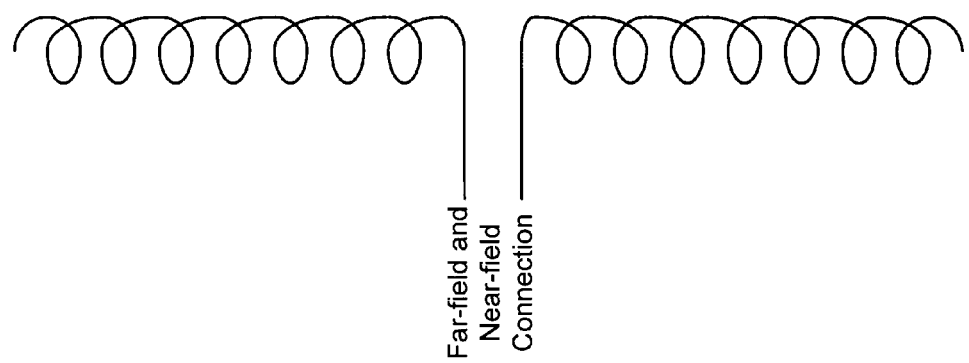

Referring to FIG. 24, the hybrid near-field and far-field antenna 42 may contain a single port. The single port transmits/receives both near-field (magnetic) and far-field (EM) energy.

Figure 25:
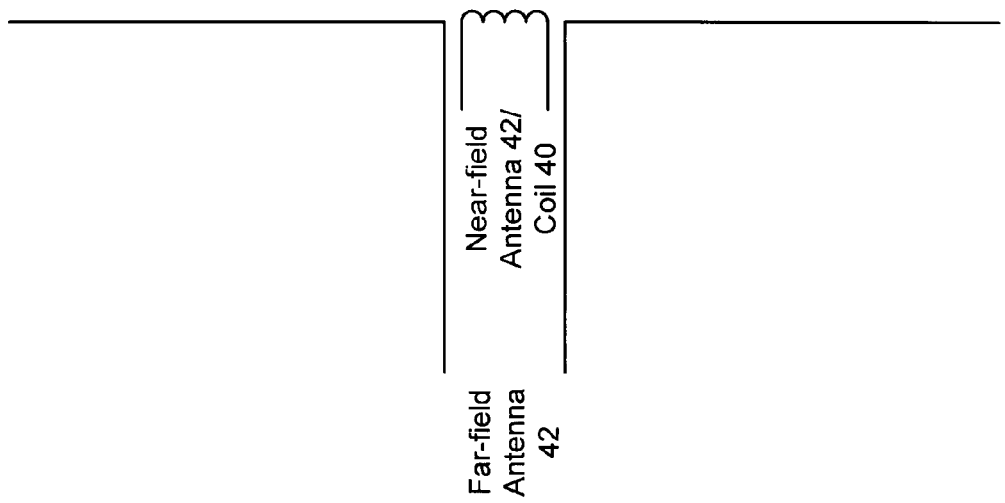
Figure 26:
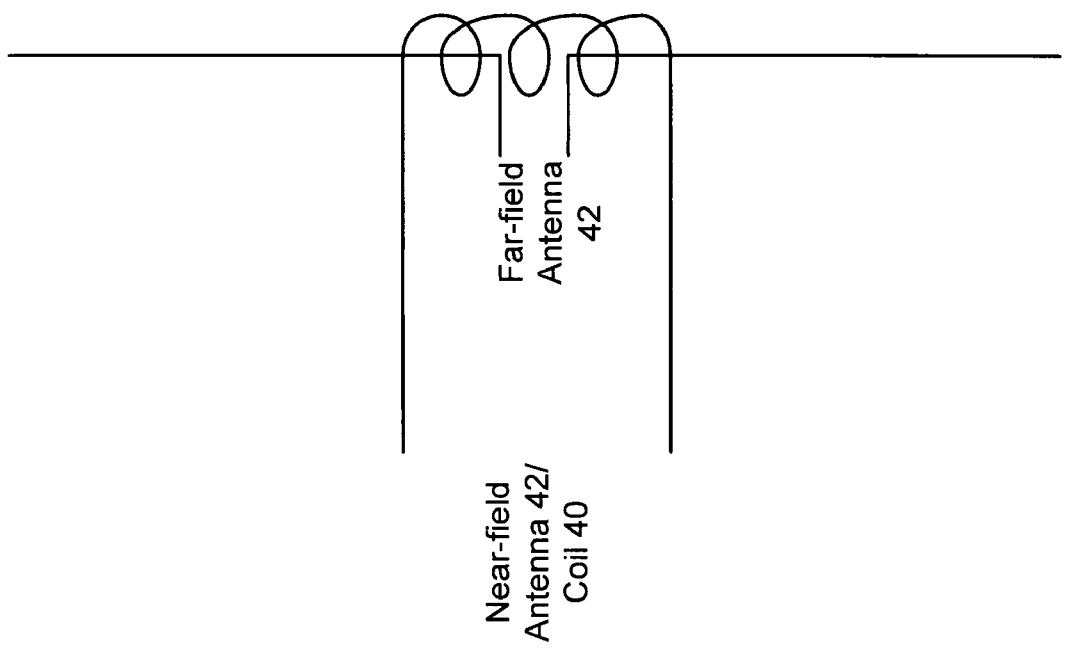

Referring to FIG. 25 and FIG. 26, the hybrid near-field and far-field antenna 42 contains two ports. The first port is for near-field (magnetic) energy transmission/reception while the second port is for far-field (EM) energy transmission/reception. The near-field portion is implemented with a coil 40 while the far-field portion is implemented with a dipole antenna 42. As shown in FIG. 25, the coil 40 may be wound between the legs of the dipole, or as shown in FIG. 26, the coil 40 may be wound around part of the dipole. In either case, a protective device 36 such as a filter or circulator may be needed to protect and/or isolate the ports from one another.

A hybrid near-field and far-field antenna 42 may be designed to be a single structure containing both a magnetic and electromagnetic transmitting/receiving apparatus. Preferably, the antenna 42 structure is optimized to efficiently transmit energy to the far-field and receive energy in the far-field. Preferably, the antenna 42 structure is also optimized to efficiently couple magnetic energy to an antenna 42/coil 40 in the near-field and receive magnetic energy from an antenna 42/coil 40 in the near-field. Examples of a hybrid near-field and far-field antenna 42 may be implemented as, but not limited to, a dipole antenna 42 with an integrated coil 40 as shown in FIGS. 23-26, or any other antenna 42 optimized to receive energy in the near and far fields. The hybrid near-field and far-field antenna 42 preferably has two inputs/outputs (depending on whether transmitting or receiving energy) wherein the magnetic and RF energy are feed/received although a single input/output is possible as shown in FIG. 24. A single dual band rectifier may be used with the hybrid near-field and far-field antenna 42 or separate rectifiers may be used with one connected to each antenna 42 port.

For the previous embodiments, the frequency generator 50 may be implemented with an oscillator, resonator, or phase-locked loop (PLL). The switch 52 may be a relay such as a SPDT or a solid state switch 52 such as a PIN diode. The controller 46 may be implemented with a microcontroller.

RF and Capacitive

Figure 27:
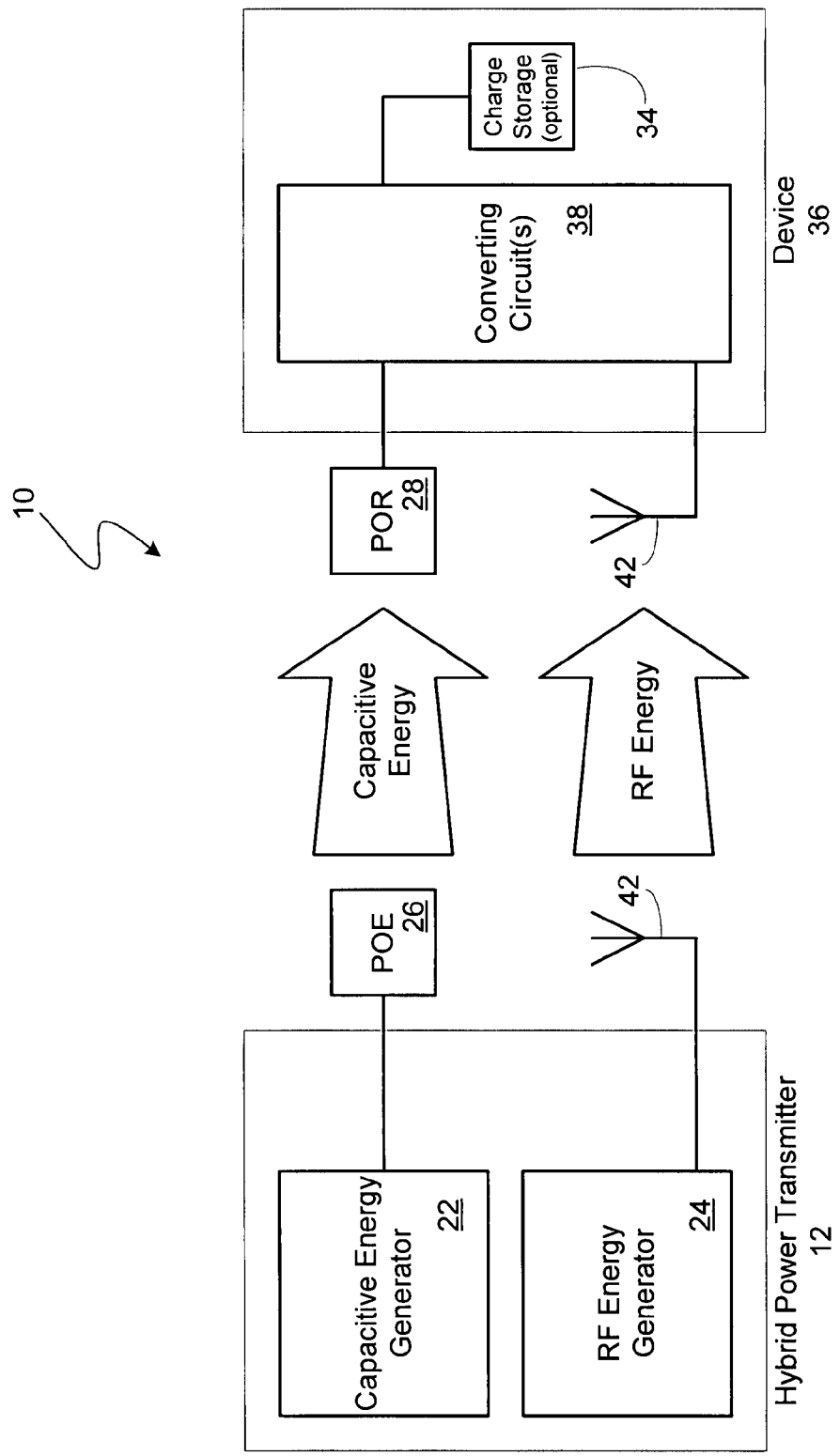
FIGS. 27-38 are illustrations of an apparatus for charging a device according to the present invention using RF energy along with other types of energy.

Referring to FIG. 27, the present invention is an apparatus for supplying power to a device 36. The device 36 may be charged, re-charged, or directly powered by the apparatus. The apparatus includes a hybrid power transmitter 12 for generating RF and capacitive (electric) field energy. The hybrid power transmitter 12 includes two different generators for generating both RF and capacitive energy. A near-field (electric field) POE, such as a capacitive plate, is connected to the capacitive energy generator included in the hybrid power transmitter 12 and radiates power at a first frequency to a near-field coverage area. A far-field antenna 42 is connected to the RF energy generator included in the hybrid power transmitter 12 and radiates power, preferably, at a second frequency to a far-field coverage area. Both coverage areas can be seen in FIG. 3. The device 36 to be powered includes one or more converting circuits 38 and one or more PORs 28, 32 configured to harvest the power from the apparatus. The POR may be implemented as a capacitive plate.

When the device 36 is in close proximity to the apparatus (i.e., in the near-field coverage area, Area 1 in FIG. 3), power is mostly received by the near-field POE. In this situation, the apparatus supplies fast charging to the device 36. The power obtained from capacitive charging (near-field) decreases as a function of distance by a factor of approximately $1/r^6$, where r is the distance from the apparatus to the device 36.

When the device 36 is not in close proximity to the apparatus (i.e., in the far-field coverage area, Area 2 in FIG. 3), power is received primarily from the far-field antenna 42. In this situation, the apparatus supplies a trickle charge to the device 36. The power obtained from far-field charging decreases as a function of distance by a factor of approximately $1/r^2$, where r is the distance from the apparatus to the device 36.

The near-field coverage area and the far-field coverage area may overlap to define an overlap coverage area. In the overlap coverage area, power is received from both the near-field and the far-field antennas 42. Overlapping coverage areas can be seen in FIG. 3.

Since the apparatus transmits power in both the near-field and the far-field regions, the device 36 may be located at varying distances from the apparatus and still receive power. For example, near-field (capacitive) charging may be employed at communications areas, such as doorways for door access. Far-field charging may be employed to cover hallways in order to supply sleep current and added functionality, such as random pinging for location identification or inventory count.

RF Energy and Light Energy

Figure 28:
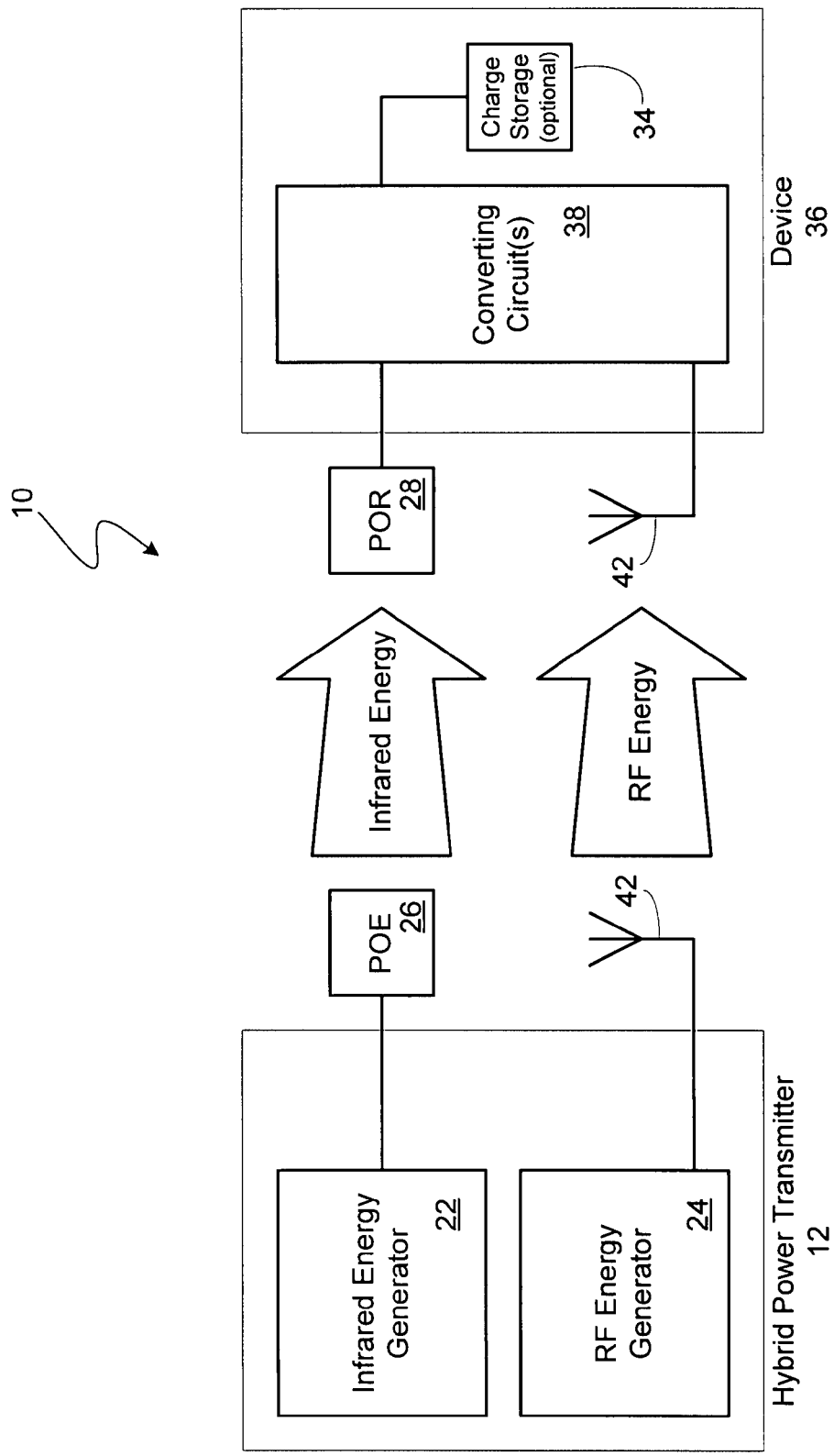
Figure 29:
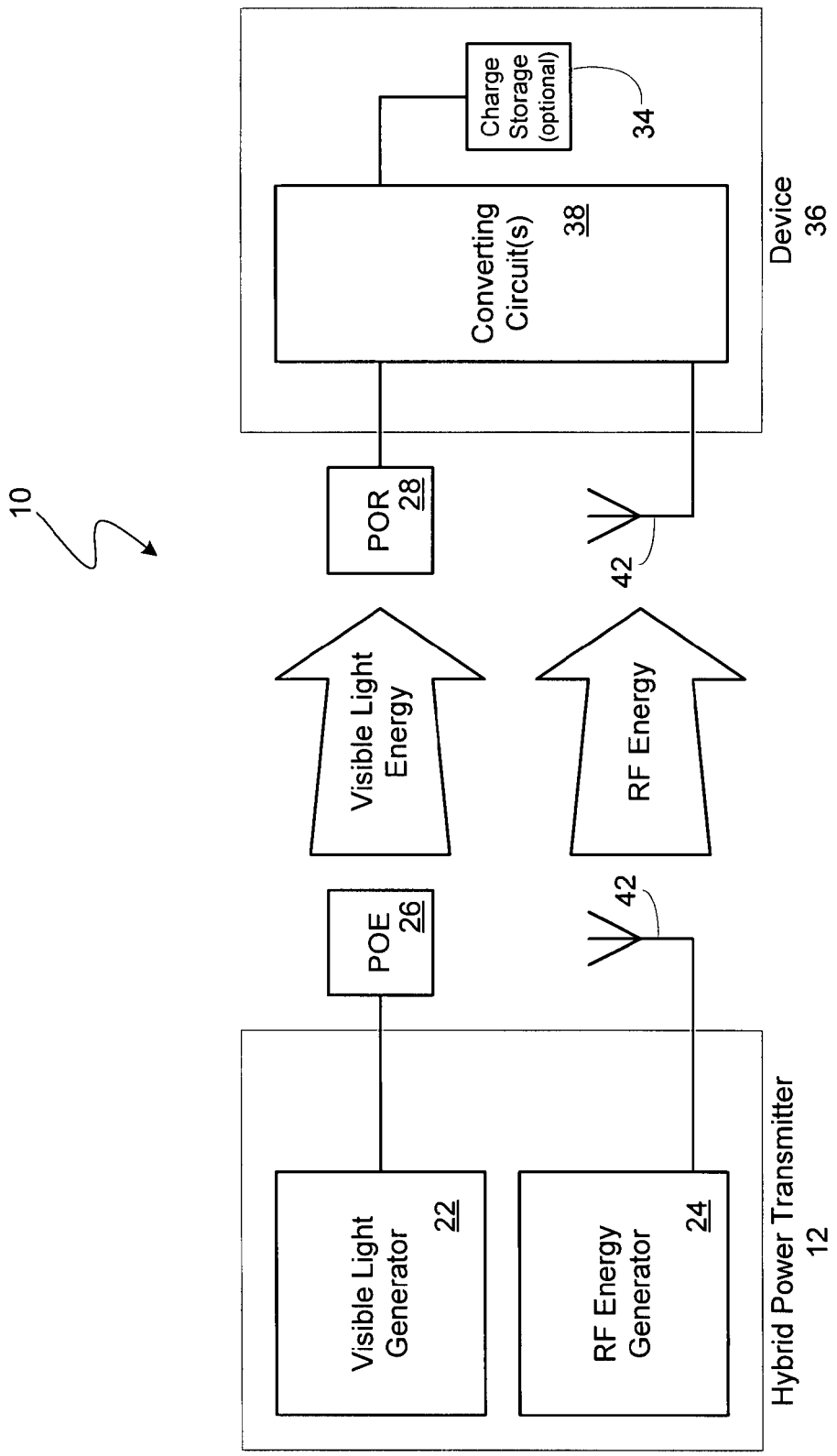
Figure 30:
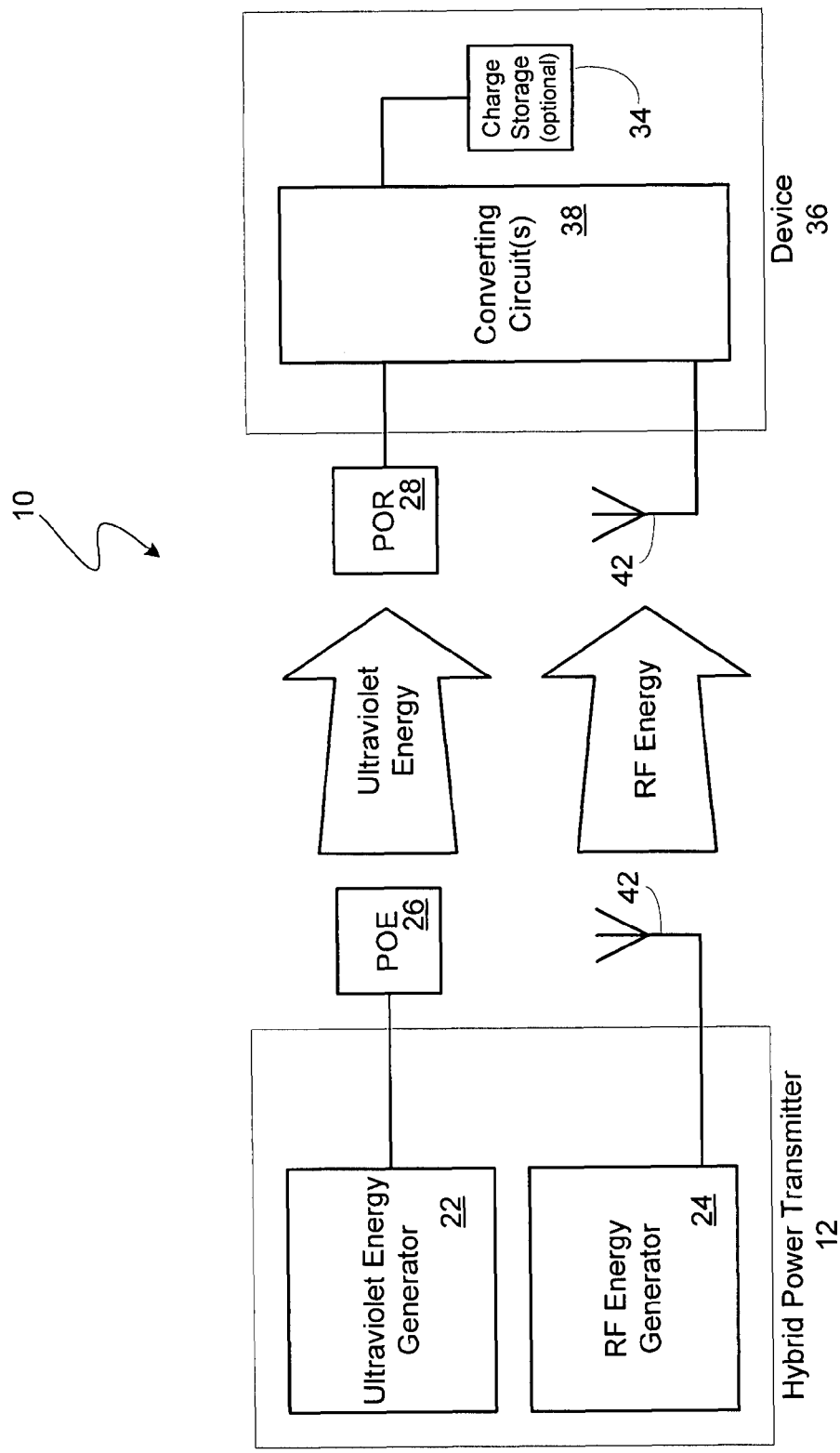

Referring to FIG. 28-30, the present invention is an apparatus for supplying power to a device 36. The device 36 may be charged, re-charged, or directly powered by the apparatus. The apparatus includes a hybrid power transmitter 12 for generating RF and light energy and a hybrid power receiver 14 for capturing RF and light energy. The hybrid power transmitter 12 includes two different generators for generating both RF and light energy. Light energy includes infrared, visible, and ultraviolet light used individually or in any combination including narrow band or full spectrum transmission. It should be noted that the infrared energy generator, visible light energy generator, or ultraviolet energy generator in the hybrid power transmitter 12 may not specifically include a POE as shown in the figures. For these types of energies, the energy generator also emits the energy. An example of this is a standard light bulb, which generates and emits the visible light energy. Examples of POEs 26, 30 would be lens, light pipes, etc. The same is true for the converting circuit 38 in the hybrid power receiver 14. The converting circuit 38 can also be view as the POR. In certain cases, lens and light pipes may be used to direct the light to the converting circuit 38. In which case, the lens or light pipe may be viewed as the POR and the converting circuit 38 would accept the light and covert it to a usable energy. Examples of light generators include, but are not limited to, light bulbs, fluorescent bulbs, full spectrum bulbs, lasers, LEDs, or any other device 36 that produces infrared, visible, or ultraviolet light. Examples of converting circuits 38 for the light energy include, but are not limited to, an infrared detector, an ultraviolet detector, a solar cell, a PIN diode, or any other device 36 used to convert light to electrical energy.

RF Energy and Subsonic/Sonic/Ultrasonic Energy

Figure 31:
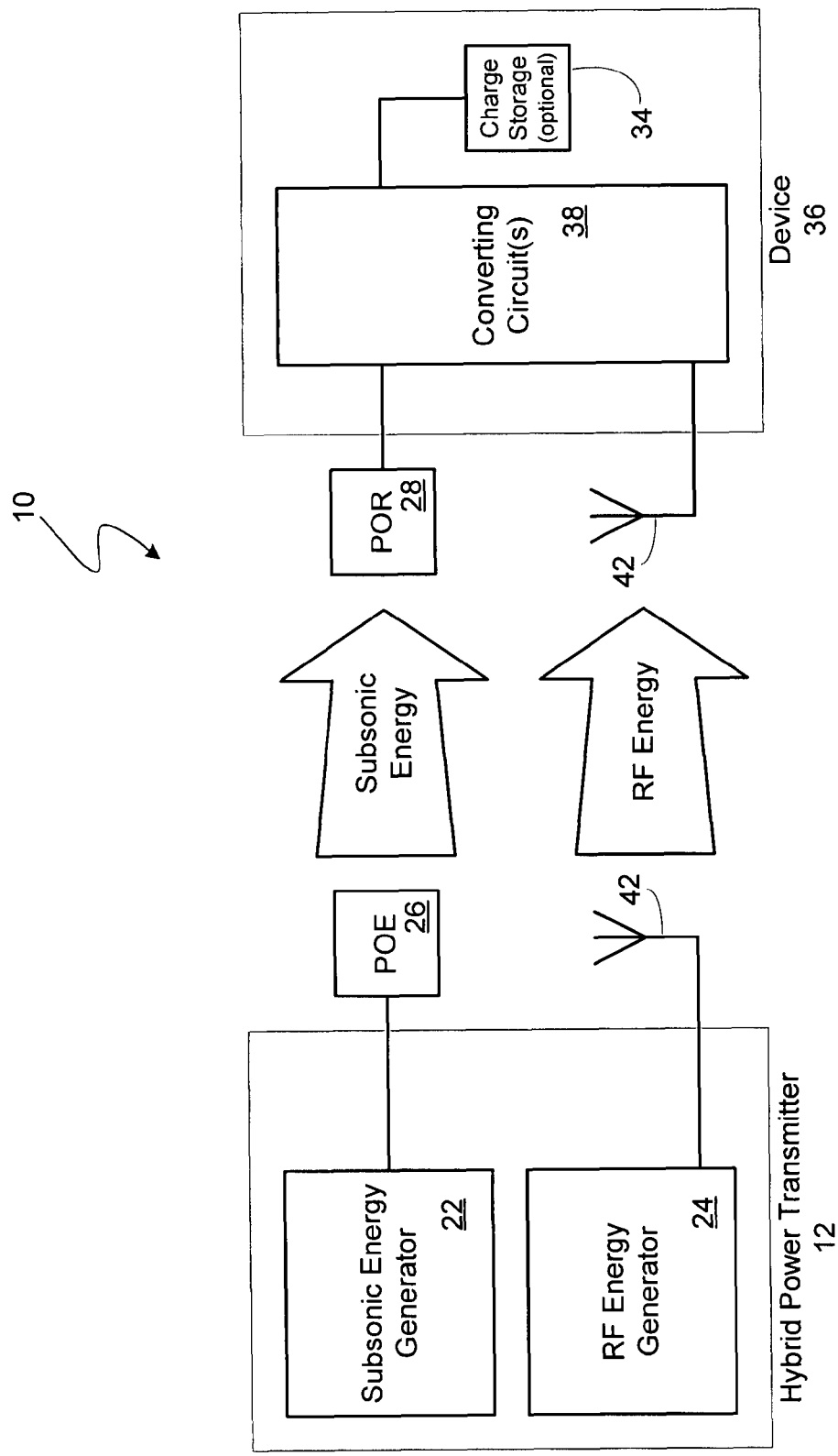
Figure 32:
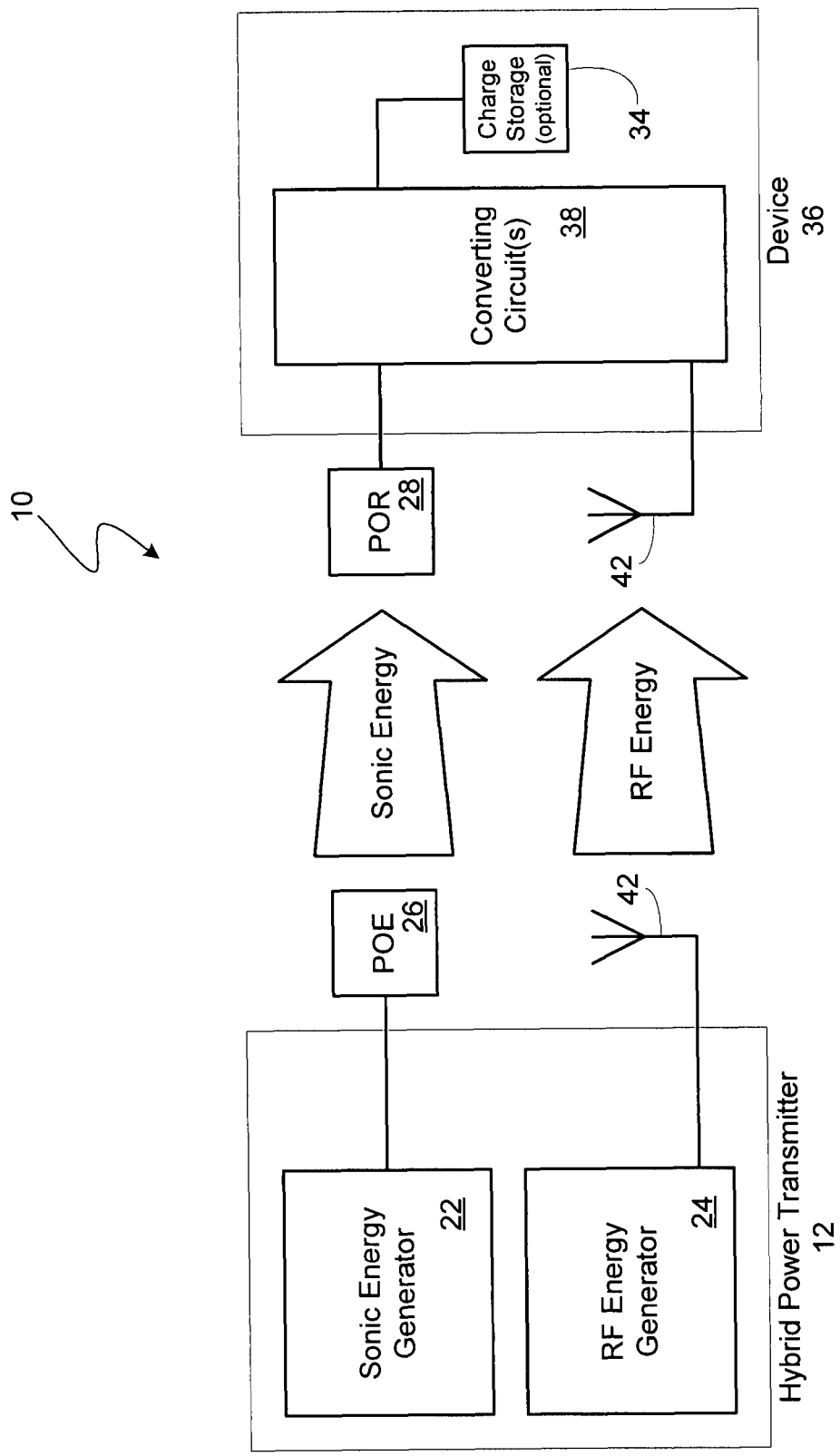
Figure 33:
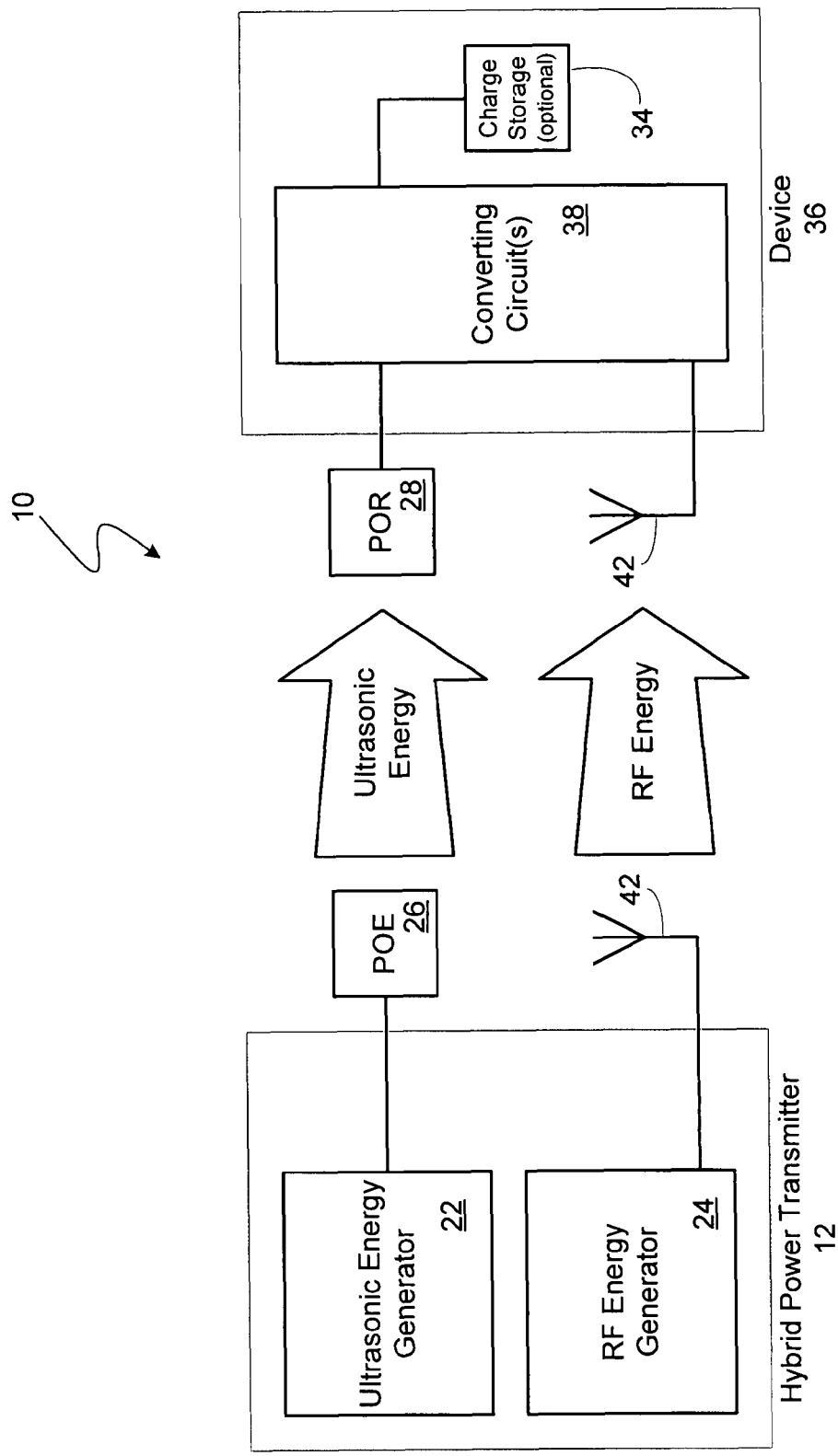

Referring to FIGS. 31-33, the present invention is an apparatus for supplying power to a device 36. The device 36 may be charged, re-charged, or directly powered by the apparatus. The apparatus includes a hybrid power transmitter 12 for generating RF and subsonic/sonic/ultrasonic energy and a hybrid power receiver 14 for capturing RF and subsonic/sonic/ultrasonic energy. The hybrid power transmitter 12 includes two different generators for generating both RF and subsonic/sonic/ultrasonic energy. Subsonic/sonic/ultrasonic energy includes non-audible and audible sound used individually or in any combination including narrow band or full spectrum transmission. Examples of subsonic/sonic/ultrasonic energy POEs 26, 30 include, but are not limited to, speakers, piezoelectric elements, or any other subsonic/sonic/ultrasonic energy-generating element. Examples of subsonic/sonic/ultrasonic energy PORs 28, 32 include, but are not limited to, microphones, piezoelectric elements, or any other subsonic/sonic/ultrasonic energy-capturing element.

RF Energy and Vibration Energy

Figure 34:
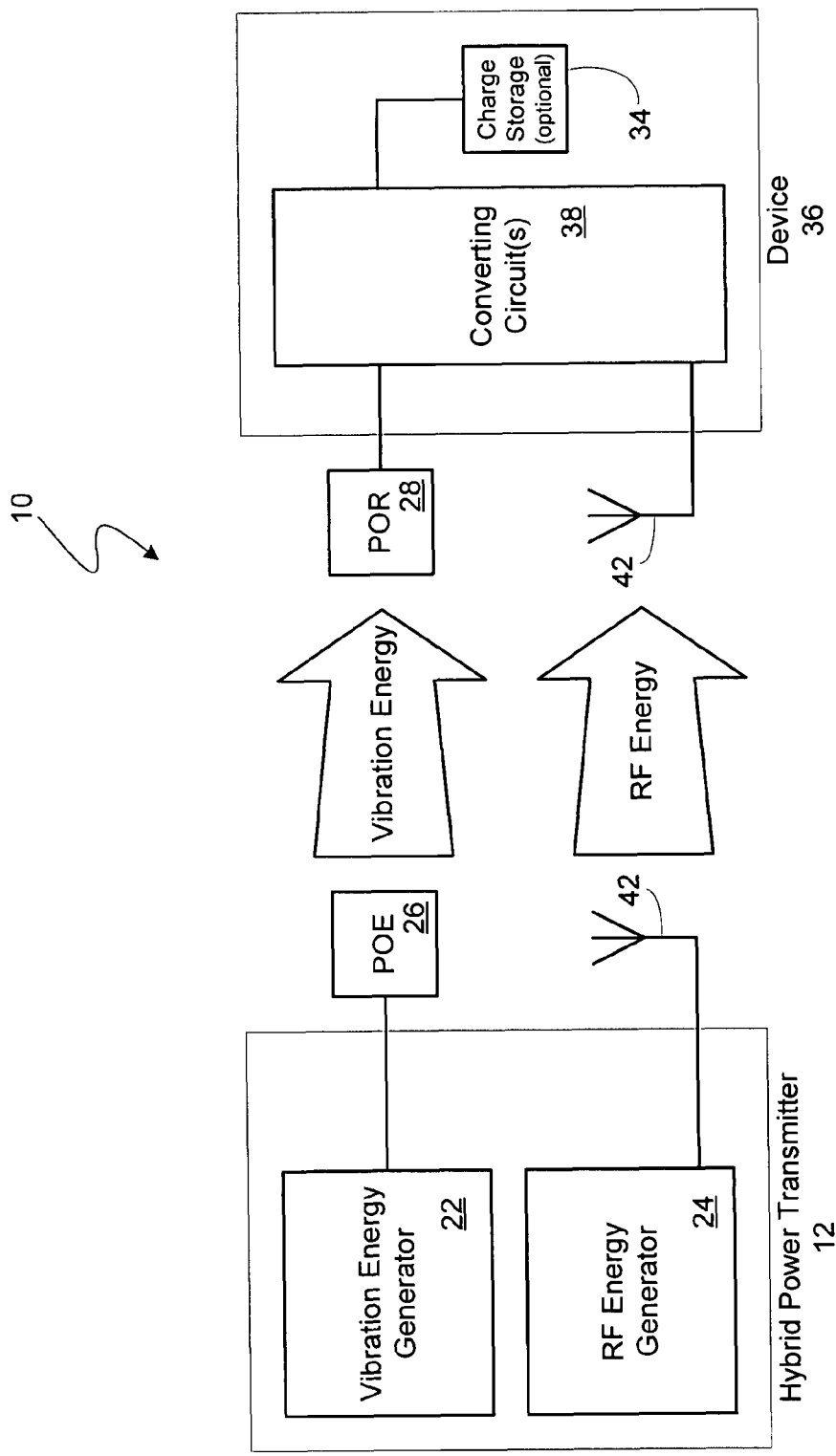

Referring to FIG. 34, the present invention is an apparatus for supplying power to a device 36. The device 36 may be charged, re-charged, or directly powered by the apparatus. The apparatus includes a hybrid power transmitter 12 for generating RF and vibration energy and a hybrid power receiver 14 for capturing RF and vibration energy. The hybrid power transmitter 12 includes two different generators for generating both RF and vibration energy. Examples of vibration energy POEs 26, 30 include, but are not limited to, tactile motors, piezoelectric elements, a coil 40 with a magnet, or any other vibration energy-creating element. Examples of vibration energy PORs 28, 32 include, but are not limited to, piezoelectric elements, a magnetic with a coil 40, or any other vibration energy-capturing element.

RF Energy and Wind Energy

Figure 35:
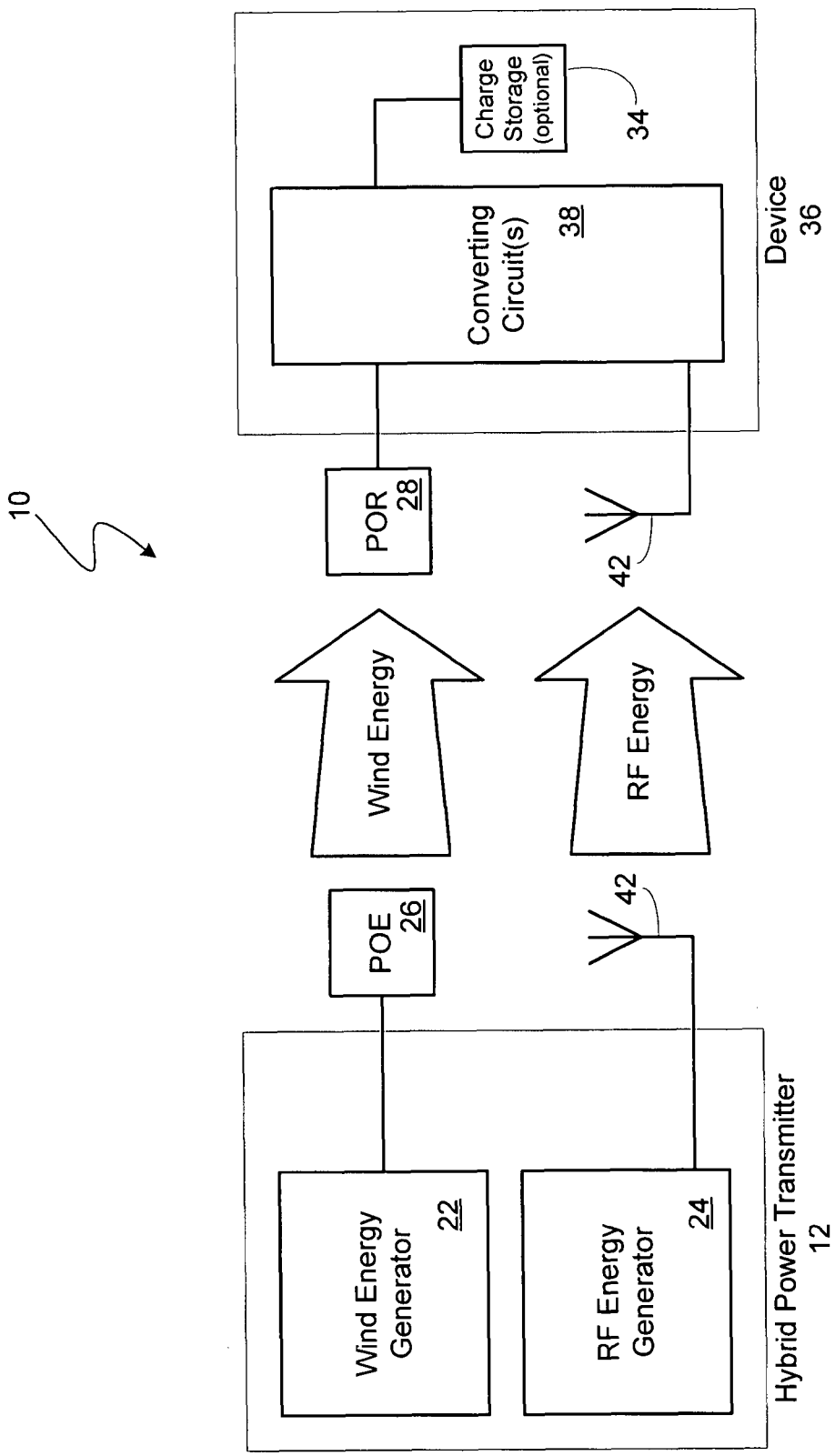

Referring to FIG. 35, the present invention is an apparatus for supplying power to a device 36. The device 36 may be charged, re-charged, or directly powered by the apparatus. The apparatus includes a hybrid power transmitter 12 for generating RF and wind energy and a hybrid power receiver 14 for capturing RF and wind energy. The hybrid power transmitter 12 includes two different generators for generating both RF and wind energy. Examples of wind energy POEs 26, 30 include, but are not limited to, fans or any other wind energy-generating element. Examples of wind energy PORs 28, 32 include, but are not limited to, fans, windmills, or any other wind energy-capturing element.

RF Energy and Thermal Energy

Figure 36:
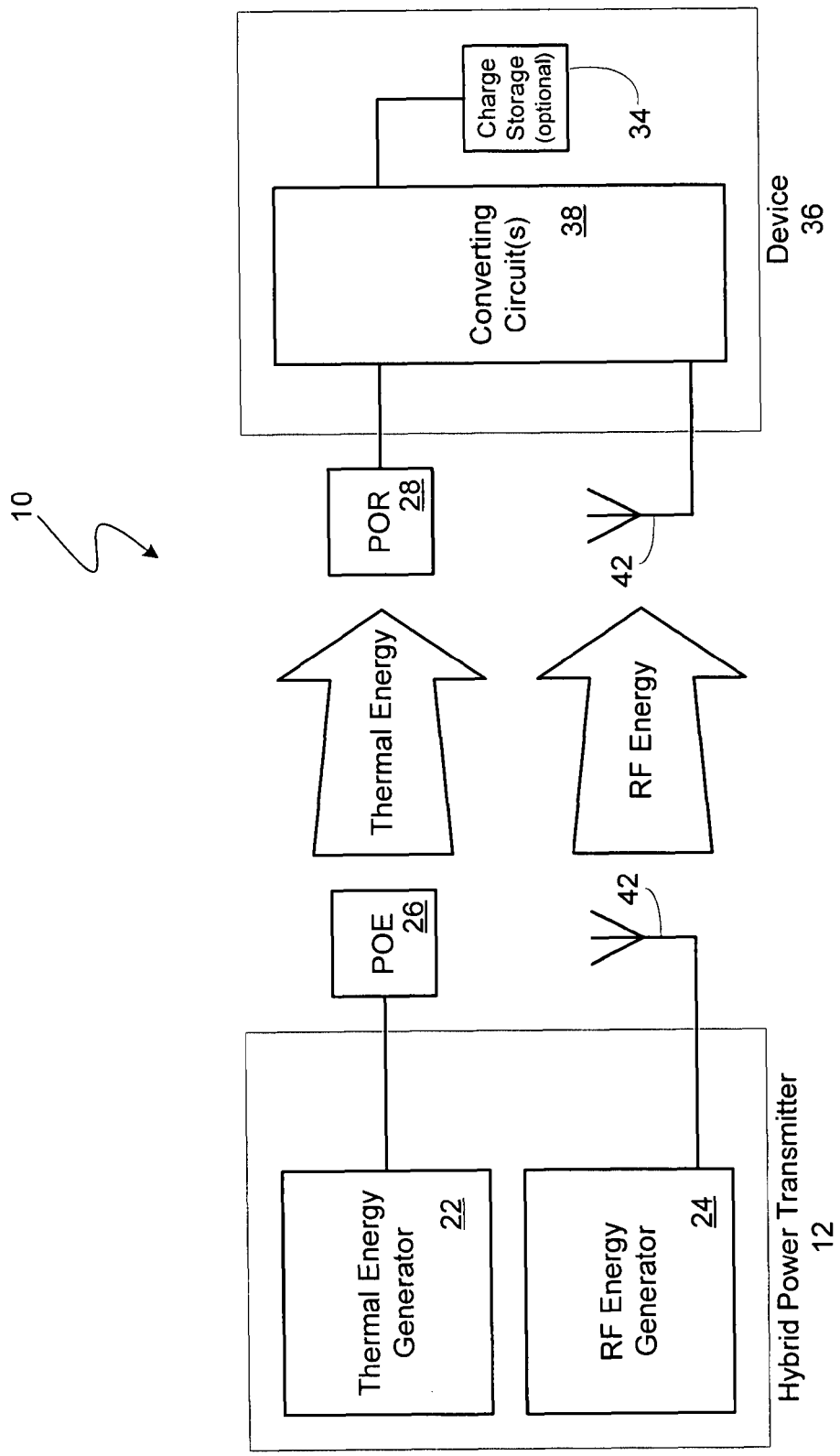

Referring to FIG. 36, the present invention is an apparatus for supplying power to a device 36. The device 36 may be charged, re-charged, or directly powered by the apparatus. The apparatus includes a hybrid power transmitter 12 for generating RF and thermal energy and a hybrid power receiver 14 for capturing RF and thermal energy. The hybrid power transmitter 12 includes two different generators for generating both RF and thermal energy. Examples of thermal energy POEs 26, 30 include, but are not limited to, heaters, resistors, or any other heat-generating element. Examples of thermal energy PORs 28, 32 include, but are not limited to, thermopiles, or any other thermal energy-capturing element.

RF Energy and Pressure Energy

Figure 37:
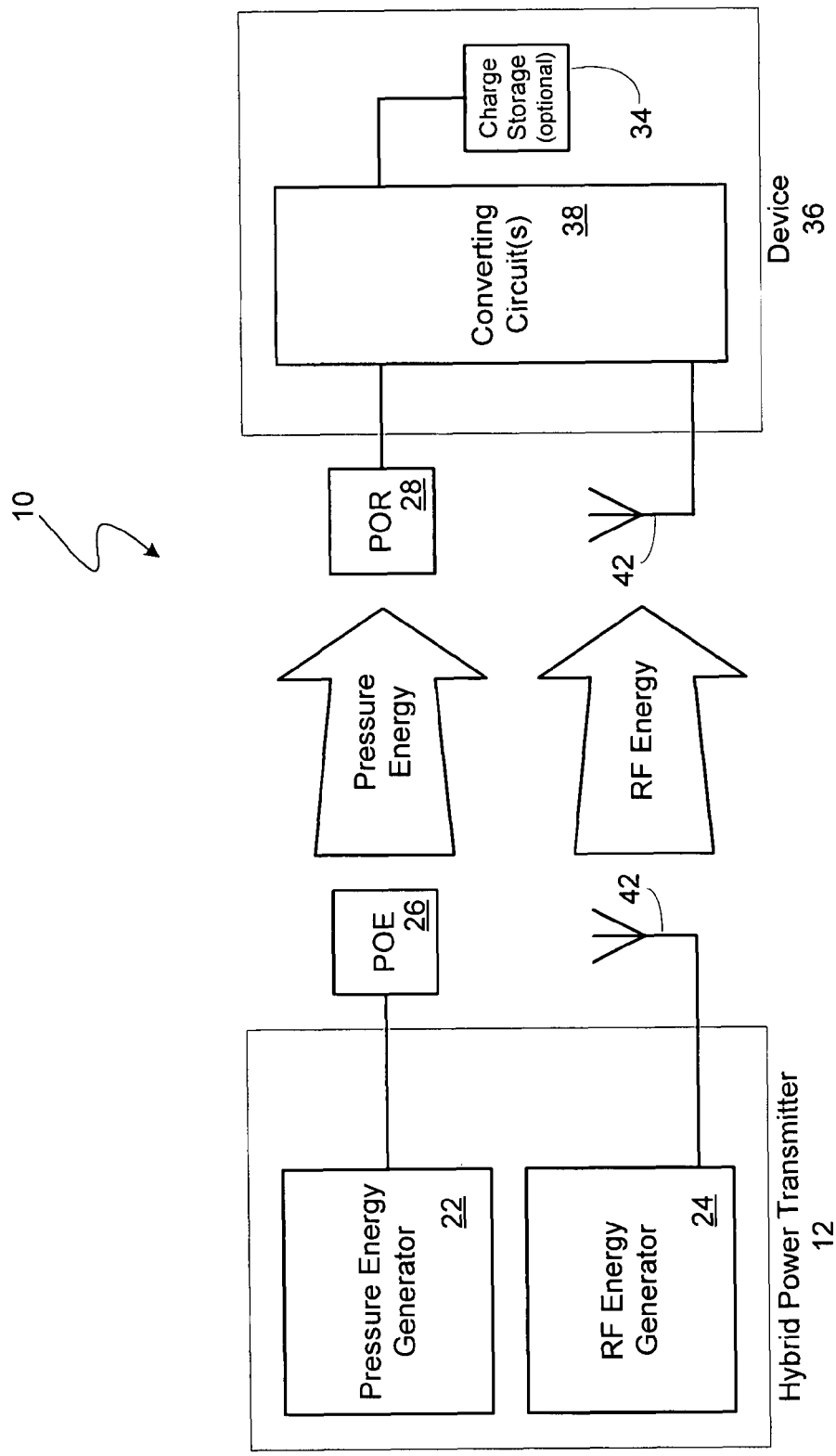

Referring to FIG. 37, the present invention is an apparatus for supplying power to a device 36. The device 36 may be charged, re-charged, or directly powered by the apparatus. The apparatus includes a hybrid power transmitter 12 for generating RF and pressure energy and a hybrid power receiver 14 for capturing RF and pressure energy. The hybrid power transmitter 12 includes two different generators for generating both RF and pressure energy. Examples of pressure energy POEs 26, 30 include, but are not limited to, valves, compressors, or any other pressure energy-creating element. Examples of pressure energy PORs 28, 32 include, but are not limited to, piezoelectric elements, or any other pressure energy-capturing element.

RF Energy and Other Types of Energy

Figure 38:
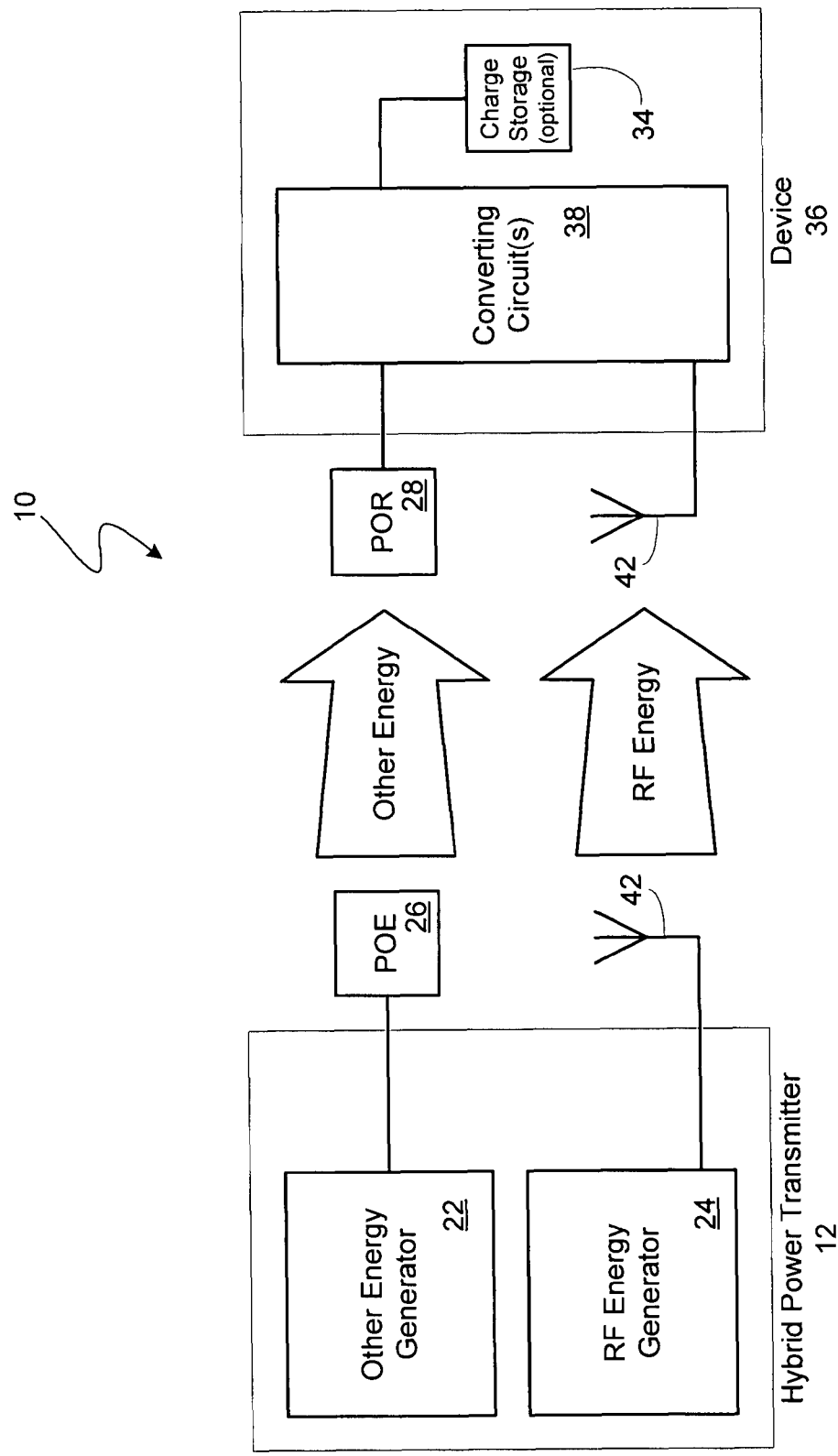

Referring to FIG. 38, the present invention is an apparatus for supplying power to a device 36. The device 36 may be charged, re-charged, or directly powered by the apparatus. The apparatus includes a hybrid power transmitter 12 for generating RF and a generator for generating a second type of energy and a hybrid power receiver 14 for capturing RF and the second type of energy.

Any Two Types of Energy

Figure 2:
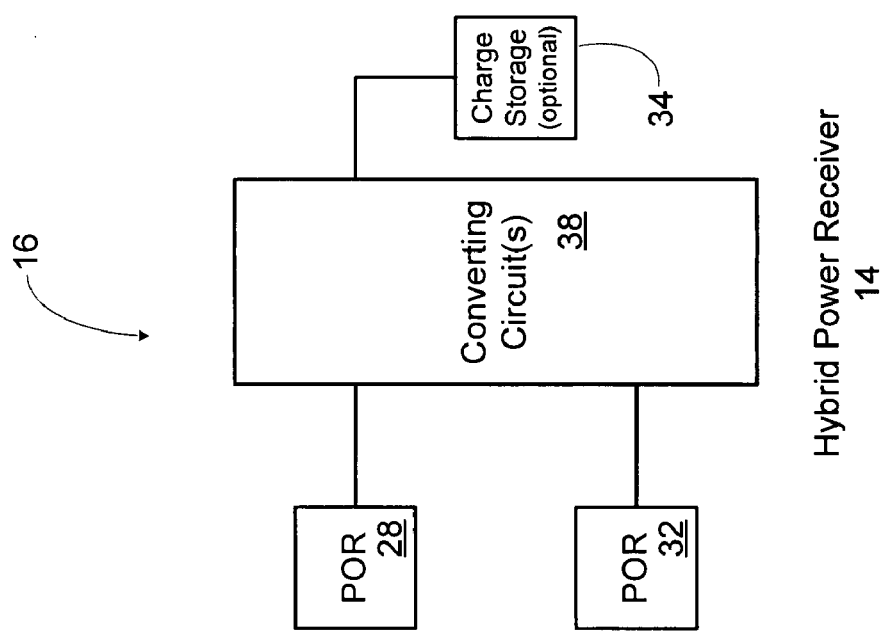
FIG. 2 is an illustration of a hybrid power receiver according to the present invention.

Referring to FIG. 1, the present invention is an apparatus for supplying power to a device 36. The device 36 may be charged, re-charged, or directly powered by the apparatus. The apparatus includes a hybrid power transmitter 12 for generating a first type of energy and a second type of energy and a hybrid power receiver 14 for capturing the first type of energy and the second type of energy and converting it to a usable form.

In any of the embodiments, any of the energy generators in the hybrid power transmitter 12 may not specifically include a POE as shown in the figures. The point of emission may be the energy generator.

In any of the embodiments, any of the converting circuits 38 or energy harvesters 16 in the hybrid power receiver 14 may not specifically include a POR as shown in the figures. The point of reception may be the energy harvester 16.

In any of the embodiments, additional types of energy may be added to the hybrid power transmitter 12 depending on the requirements of the application. As an example, the hybrid power transmitter 12 may transmit RF (electromagnetic field), inductive (magnetic field), capacitive (electric field), visible light, infrared (IR) light, ultra-violet (UV) light, solar, subsonic, sonic, ultrasonic, vibration, wind, pressure (short and long wavelength), or any other type of energy or any combination thereof.

In any of the embodiments, the types of energy transmitted by the hybrid power transmitter 12 may not match all the types of energy harvestable by the hybrid power receiver 14.

In any of the embodiments, one type of energy may be implemented as a pad. As an example, for inductive, capacitive, vibration, thermal, or any other energy that requires close proximity, the energy must be relatively close to the device 36 in order to transfer significant power. In this case, a pad may be designed that emits the appropriate energy. When the device 36 is in contact with or within the coverage area, the hybrid power receiver 14 can convert that energy to a usable form. For the case of vibration, the pad may produce a high frequency vibration. When the device 36 is on the pad, the vibration is transferred to the device 36 and the hybrid power receiver 14 can harvest the vibration energy.

In all the embodiments, the energy captured by the PORs 28, 32 may be combined and then converted to usable energy or converted individually and the usable energies obtained from each conversion circuit can be combined and supplied to the device 36 or the charge storage 34 component. The conversion circuit used by each type of energy may be different. An example of an AC to DC conversion circuit that may be used with the invention was disclosed in U.S. Provisional Application 60/729,792. In certain applications, an AC output may be required and therefore an inverter circuit may be used to convert a DC signal, for example from the output of a solar cell, to an AC signal.

Transmitting multiple types of energy adds flexibility to the system 10. For example, different types of energy are affected differently by different materials. Specifically, RF can travel through numerous non-metallic materials without significant attenuation while light is frequently blocked. Another benefit is the reduction in transmitted power for a given energy type. As an example, if RF energy is transmitted with UV light each source can supply half of the required energy to the device 36. When compared to transmitting a single source of energy, the level of UV would be lower when including RF energy therefore reducing the level of UV and thus reducing any harmful effects to animals.

It should be noted that some of the energy types listed bear resemblance to one another. However, the different energies listed inherently have different characteristics in how they propagate, how they are generated and/or converted, and how they are emitted and/or received using POEs 26, 30 and/or PORs 28, 32, which make them different from an energy harvesting point of view. As an example, electromagnetic energy has both a magnetic and electric component, however, it is different from magnetic energy itself and electric energy itself in the way it propagates and in the way it is emitted and received. Electromagnetic energy uses an antenna 42 as a POE or POR. Magnetic energy typically uses a coil 40 as a POE or POR and can be viewed as an air core transformer. Capacitive energy typically uses a plate as a POE or POR and can be viewed as an air core capacitor. The resulting change in power density of the energies as a function of distance, as previously described, varies differently. The same differences in characteristics exist for the different types of light and sonic energies. These energies inherently have different characteristics in how they propagate, how they are generated and/or converted, and how they are emitted and/or received using POEs 26, 30 and/or PORs 28, 32, which make them different from an energy harvesting point of view. Thus, for instance electromagnetic energy in a given recognized spectrum range to one skilled in the art (i.e., UV) that is transmitted at a first frequency and at a second frequency within the recognized spectrum, or alternatively at a first intensity and at a second intensity, or at a first time and a second time, would be considered the same type of energy. The same holds true for the other types of energies described herein.

In any embodiment of the present invention, a controller 46 may be introduced in the hybrid power transmitter 12 and/or in the hybrid power receiver 14 in order to control an aspect of the transmission or reception of wireless energy. A transmission controller 46 may control one or more of the energy generators and/or one or more of the POEs 26, 30. A reception controller 46 may control one or more of the converting circuits 38 (including the output to a device 36 or charge storage 34 component) and/or one or more of the PORs 28, 32.

In any of the embodiments, the hybrid power transmitter 12 or hybrid power receiver 14 may have a housing. It should be noted that the POEs 26, 30 or POR(s) may be located inside or outside the housing.

In any of the embodiments, the different types of energy may be pulsed, transmitted at different times, transmitted for different durations, transmitted with different amplitudes or power levels, or in any other way found to be advantageous.

In any embodiment of the present invention, a switch 52 may be introduced in the hybrid power transmitter 12 and/or in the hybrid power receiver 14 in order to route the flow and timing of energy. The switch 52 may be controlled by a controller 46, timer, user, etc.

In any embodiment of the present invention, the transmitted energy may be limited to include power only, that is, data is not present in the signal. If data is required by the application, the data is, preferably, transmitted in a separate band and/or has a separate receiver 14, for example, via the communication component discussed above.

In any embodiment of the present invention, the transmitted energy may be done with varying amplitude such as pulsing. Pulsing increase the efficiency and range of the power harvesting receiver 14 by providing a burst of energy to overcome any minimum power requirements or thresholds or voltage thresholds of the converting circuit 38 while allowing for a lower average transmitted power level.

It will be understood by those skilled in the art that while the foregoing description sets forth in detail preferred embodiments of the present invention, modifications, additions, and changes might be made thereto without departing from the spirit and scope of the invention.

The invention claimed is:

1. A system, comprising:
a transmitter configured to wirelessly transmit a first type of energy and a second type of energy different from the first type of energy; and
a receiver including a near field antenna and a far field antenna, the near field antenna configured to receive the first type of energy wirelessly transmitted from the transmitter, the far field antenna configured to receive the second type of energy wirelessly transmitted from the transmitter,
the receiver including a first rectification circuit and a second rectification circuit, the first rectification circuit configured to convert the first type of energy received by the near field antenna into usable energy, the second rectification circuit configured to convert the second type of energy received by the far field antenna into usable energy,
the near field antenna having an impedance value such that operation of the near field antenna does not interfere with operation of the far field antenna, the impedance value of the near field antenna being associated with impedance matching of the far field antenna to the second rectification circuit, the far field antenna having an impedance value such that operation of the far field antenna does not interfere with operation of the near field antenna, the impedance value of the far field antenna being associated with impedance matching of the near field antenna to the first rectification circuit.

2. A system as described in claim 1 wherein the first type of energy and the second type of energy are sent simultaneously from the transmitter.

3. A system as described in claim 1 wherein the first type of energy and the second type of energy are sent at different times from the transmitter.

4. A system as described in claim 1, wherein the usable energy is electrical energy.

5. A system as described in claim 1, wherein the receiver is configured to simultaneously receive the second type of energy at the far field antenna, and the first type of energy at the near field antenna.

6. A system as described in claim 1, wherein the receiver is configured to receive the second type of energy at the far field antenna at a first time and to receive the first type of energy at the near field antenna at a second time different from the first time.

7. A system as described in claim 1 wherein the transmitter includes at least a first point of emission configured to transmit the first type of energy and the second type of energy.

8. A system as described in claim 1 wherein the transmitter includes a first point of emission configured to transmit the first type of energy, and a second point of emission configured to transmit the second type of energy.

9. A system as described in claim 8 wherein the first point of emission has a first coverage area and the second point of emission has a second coverage area.

10. A system as described in claim 9 wherein the first and second coverage areas overlap.

11. A system as described in claim 8 wherein the first point of emission includes a near field antenna and the second point of emission includes a far field antenna.

12. A system as described in claim 11 wherein the transmitter includes a first frequency generator connected to the near field antenna of the transmitter that produces power at a first frequency, and a second frequency generator connected to the far field antenna of the transmitter that produces power at the second frequency.

13. A system as described in claim 12 wherein the transmitter includes an amplifier connected to the first and second frequency generators.

14. A system as described in claim 12 wherein the transmitter includes a controller in electrical communication with the first and second frequency generators to determine whether the far field antenna of the near field antenna transmits power at a given time.

15. A system as described in claim 14 wherein the controller is configured to pulse the power using the first and second frequency generators.

16. A system as described in claim 15 wherein the transmitter includes a combiner in electrical communication with the first and second frequency generators.

17. A system as described in claim 16 wherein the transmitter includes a switch connected to the combiner, the combiner configured to combine the power at the first frequency and at the second frequency into one transmission that is sent to the switch.

18. A system as described in claim 17 wherein the first point of emission has a high impedance with respect to the second frequency such that substantially no power is transmitted from the first point of emission at the second frequency, the second point of emission has a high impedance with respect to the first frequency such that substantially no power is transmitted from the second point of emission at the first frequency.

19. A system as described in claim 18 wherein the transmitter includes an in-line circulator in electrical communication with the switch that reroutes any reflections or feedback to a matched load.

20. A system as described in claim 11 wherein the transmitter includes a dual frequency generator in electrical communication with the near field antenna of the transmitter and the far field antenna of the transmitter that transmits power at a first frequency to the near field antenna of the transmitter and at a second frequency to the far field antenna of the transmitter.

21. A system as described in claim 20 wherein the transmitter includes a first amplifier in electrical communication with and disposed between the dual frequency generator and the near field antenna of the transmitter, and a second amplifier in electrical communication with and disposed between the dual frequency generator and the far field antenna of the transmitter.

22. A system as described in claim 21 wherein the transmitter includes a controller in electrical communication with the dual frequency generator, the near field antenna of the transmitter, and the far field antenna of the transmitter, the controller configured to control whether the near field antenna or the far field antenna transmits power at any given time.

23. A system as described in claim 11 wherein the transmitter includes a frequency generator, a controller in electrical communication with the frequency generator and configured to control the frequency at which power is produced by the frequency generator, an amplifier in electrical communication with the controller to control a gain of the amplifier, a switch in electrical communication with the controller to control the switch and whether the power is directed to the near field antenna of the transmitter or the far field antenna of the transmitter.

24. A system as described in claim 1, wherein the first type of energy is one of RF energy, inductive energy, capacitive energy, visible light energy, infrared light energy, ultraviolet light energy, solar energy, sub-sonic energy, sonic energy, ultra-sonic energy, vibration energy, wind energy, or pressure energy.

25. A system as described in claim 1 including a dual band antenna/coil configured to transmit both RF and magnetic energy.

26. A system as described in claim 25 wherein the dual band antenna/coil includes a broadband antenna.

27. A system as described in claim 1, wherein the receiver includes a charge storage component configured to store the usable energy converted from the first type of energy and the second type of energy, the charge storage component being electrically coupled to the first rectification circuit and the second rectification circuit.

28. A system as described in claim 1, wherein the receiver includes a controller configured to control at least one of the first rectification circuit or the second rectification circuit.

29. A system as described in claim 1, wherein the first rectification circuit is one of a dual band rectification circuit or a broadband rectification circuit.

30. A system as described in claim 1, wherein the receiver is coupled to a device having a component disposed therein, the receiver configured to power the component of the device during operation of the receiver.

31. A system as described in claim 30, wherein the receiver includes a charge storage component configured to store at least a portion of the usable energy converted from the first type of energy and the second type of energy, the usable energy stored within the charge storage component being provided to the component of the device to power the component of the device during operation of the receiver.

32. A system as described in claim 1, wherein the first type of energy is RF energy and the second type of energy is light energy.

33. A system, comprising:
a transmitter configured to wirelessly transmit of near field magnetic energy signals and a far field electromagnetic energy signal; and
a receiver including a single antenna having a first component configured to capture magnetic energy and a second component configured to capture electromagnetic energy, the first component configured to receive the near field magnetic energy signal transmitted from the transmitter from a first port of the single antenna, the second component configured to receive the far field electromagnetic energy signal transmitted from the transmitter from a second port of the single antenna,
the receiver including a plurality of filters configured to electrically isolate the first port of the single antenna from the second port of the single antenna,
the receiver configured to convert the near field magnetic energy signal and the far field electromagnetic energy signal into usable energy.

34. A system as described in claim 33, wherein the receiver includes a power harvester configured to convert the near field magnetic energy signal received and the far field electromagnetic energy signal received into usable energy.

35. The system of claim 33, wherein the receiver includes a charge storage component, a first rectification circuit and a second rectification circuit,
the first rectification circuit configured to convert near field magnetic energy signals into usable energy,
the second rectification circuit configured to convert the far field electromagnetic energy signals into usable energy,
the charge storage component configured to store at least a portion of the usable energy converted from the near field magnetic energy signals and the far field electromagnetic energy signal.

36. A system as described in claim 35, wherein the receiver includes a controller configured to control at least one of the first rectification circuit or the second rectification circuit.

37. The system as described in claim 33, wherein the second component includes a dipole, and the first component includes a coil wound around at least a portion of the dipole.

38. A system as described in claim 33, wherein the receiver is configured to simultaneously receive the near field magnetic energy signal at the first component, and the far field electromagnetic energy signal at the second component.

39. A system, comprising:
a transmitter configured to wirelessly transmit a first type of energy and a second type of energy different from the first type of energy; and
a receiver including a single antenna having a first component configured to capture magnetic energy and a second component configured to capture electromagnetic energy, the first component configured to receive, from a single port of the single antenna, the first type of energy wirelessly transmitted from the transmitter, the second component configured to receive, from the single port of the single antenna, the second type of energy wirelessly transmitted from the transmitter, the second component including a dipole, the first component including a coil wound around at least a portion of the dipole, the receiver configured to convert the first type of energy received and the second type of energy received into usable energy.

40. A system as described in claim 39, wherein the receiver includes a first rectification circuit and a second rectification circuit, the first rectification circuit configured to convert the first type of energy to a portion of the usable energy, the second rectification circuit configured to convert the second type of energy to a portion of the usable energy.

41. A system as described in claim 40, wherein the first component of the single antenna is electrically coupled to the first rectification circuit, the second component of the single antenna is electrically coupled to the second rectification circuit.

42. A system as described in claim 39, wherein the first type of energy is a near field magnetic energy, the second type of energy is a far field electromagnetic energy.

43. A system as described in claim 39, wherein the receiver includes a single rectification circuit configured to convert the first type of energy into a portion of the usable energy and to convert the second type of energy into a portion of the usable energy.

44. The system of claim 39, wherein the receiver is configured to simultaneously receive the first type of energy at the first component of the single antenna, and the second type of energy at the second component of the single antenna.

45. The system of claim 39, wherein the first type of energy is a magnetic energy, and the second type of energy is an electromagnetic energy.

46. A system as described in claim 39, wherein the receiver includes a power harvester configured to convert the first type of energy received and the second type of energy received into the usable energy.

47. A system as described in claim 39, wherein the receiver includes a charge storage component configured to store the usable energy converted from the first type of energy and the second type of energy.

48. A system as described in claim 39, wherein the receiver is coupled to a device having a component disposed therein, the receiver configured to power the component of the device during operation of the receiver.

* * * * *